(12) United States Patent  
Soliman et al.

(10) Patent No.: US 7,841,433 B2
(45) Date of Patent: Nov. 30, 2010

(54) NEGATIVE DRIVELINE TORQUE CONTROL INCORPORATING TRANSMISSION STATE SELECTION FOR A HYBRID VEHICLE

(75) Inventors: Ihab Soliman, Warren, MI (US); Deepak Aswani, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 794 days.

(21) Appl. No.: 11/766,055

(22) Filed: Jun. 20, 2007

(65) Prior Publication Data

US 2008/0314661 A1  Dec. 25, 2008

(51) Int. Cl.
*B60W 20/00* (2006.01)
(52) U.S. Cl. .................. 180/65.265; 180/65.21; 477/3; 701/51
(58) Field of Classification Search .......... 180/65.1, 180/65.21, 65.225, 65.245, 65.25, 65.26, 180/65.265, 65.275, 65.28, 65.285, 65.31, 180/65.51, 65.6, 65.7; 903/915, 930, 940, 903/941, 942, 947; 477/3, 4, 5, 6, 115; 701/22, 701/51, 53, 54, 101
See application file for complete search history.

(56) References Cited

U.S. PATENT DOCUMENTS

| 4,335,429 | A | | 6/1982 | Kawakatsu | |
|---|---|---|---|---|---|
| 5,495,906 | A | * | 3/1996 | Furutani | 180/65.23 |
| 6,334,079 | B1 | | 12/2001 | Matsubara et al. | 701/22 |
| 6,371,878 | B1 | | 4/2002 | Bowen | |
| 6,512,967 | B2 | | 1/2003 | Osterberg et al. | |
| 6,527,659 | B1 | | 3/2003 | Klemen et al. | |
| 6,617,703 | B2 | * | 9/2003 | Matsubara et al. | 290/40 C |
| 6,775,601 | B2 | * | 8/2004 | MacBain | 701/22 |
| 6,827,167 | B2 | | 12/2004 | Cikanek et al. | |
| 6,835,160 | B2 | | 12/2004 | Kitano et al. | |
| 6,837,323 | B2 | * | 1/2005 | Denton et al. | 180/65.26 |
| 6,853,893 | B2 | | 2/2005 | Corcione et al. | |
| 6,862,511 | B1 | | 3/2005 | Phillips et al. | |
| 6,890,283 | B2 | | 5/2005 | Aoki | |
| 6,907,337 | B2 | | 6/2005 | Phillips et al. | |
| 6,915,198 | B2 | | 7/2005 | Phillips et al. | |
| 6,988,976 | B2 | | 1/2006 | Potter | |
| 6,991,053 | B2 | | 1/2006 | Kuang et al. | |

(Continued)

FOREIGN PATENT DOCUMENTS

DE   698 16 387   4/2004

(Continued)

OTHER PUBLICATIONS

United Kingdom Intellectual Property Office, Search Report for GB0810524.9, Oct. 7, 2008, 1 page.

(Continued)

*Primary Examiner*—J. Allen Shriver, II
*Assistant Examiner*—Jacob Meyer
(74) *Attorney, Agent, or Firm*—David B. Kelley; Alleman Hall McCoy Russell & Tuttle LLP

(57) ABSTRACT

A hybrid propulsion system for a passenger vehicle is provided. The system comprises a first and second electric motor in the drivetrain, in addition to a transmission. When each of the motors are providing braking torque, the transmission state is adjusted in response to the amounts of braking torque provided by the first and second motors.

20 Claims, 12 Drawing Sheets

U.S. PATENT DOCUMENTS

| | | | |
|---|---|---|---|
| 6,994,360 | B2 | 2/2006 | Kuang et al. |
| 7,071,642 | B2 | 7/2006 | Wilton et al. |
| 7,109,596 | B2 * | 9/2006 | Shimizu .................. 290/40 C |
| 7,131,708 | B2 * | 11/2006 | Tao et al. .................... 303/152 |
| 7,151,987 | B2 | 12/2006 | Tobler et al. |
| 7,344,472 | B2 * | 3/2008 | Hickam ........................ 477/5 |
| 7,434,641 | B2 * | 10/2008 | Takami et al. ............ 180/65.25 |
| 7,455,609 | B2 * | 11/2008 | Raghavan ...................... 475/5 |
| 7,477,031 | B2 * | 1/2009 | Ogata et al. ................. 318/430 |
| 7,513,847 | B2 * | 4/2009 | Tabata et al. .................. 477/15 |
| 7,534,190 | B2 * | 5/2009 | Tabata et al. ................... 477/3 |
| 7,544,140 | B2 * | 6/2009 | Tabata et al. ................... 475/5 |
| 7,585,242 | B2 * | 9/2009 | Endo ........................ 475/117 |
| 7,645,209 | B2 * | 1/2010 | Dreibholz et al. .............. 477/5 |
| 2002/0063000 | A1 * | 5/2002 | Kojima ..................... 180/65.1 |
| 2002/0063540 | A1 | 5/2002 | Oshima et al. |
| 2003/0190995 | A1 | 10/2003 | Aoki |
| 2004/0034460 | A1 | 2/2004 | Folkerts et al. |
| 2004/0129470 | A1 | 7/2004 | Huesler et al. |
| 2004/0147365 | A1 | 7/2004 | Komeda et al. |
| 2004/0166980 | A1 | 8/2004 | Supina et al. |
| 2004/0251064 | A1 | 12/2004 | Imai |
| 2005/0003928 | A1 * | 1/2005 | Niki et al. ...................... 477/5 |
| 2005/0060079 | A1 * | 3/2005 | Phillips et al. ................ 701/53 |
| 2005/0228553 | A1 | 10/2005 | Tryon |
| 2006/0064225 | A1 * | 3/2006 | Tabata et al. .................. 701/96 |
| 2006/0070779 | A1 | 4/2006 | Kuang et al. |
| 2007/0068714 | A1 | 3/2007 | Bender |
| 2008/0196953 | A1 * | 8/2008 | Soliman et al. ........... 180/65.2 |
| 2008/0196954 | A1 * | 8/2008 | Soliman et al. ........... 180/65.2 |
| 2008/0314661 | A1 * | 12/2008 | Soliman et al. ........... 180/65.4 |
| 2008/0318728 | A1 * | 12/2008 | Soliman et al. ................. 477/4 |
| 2009/0145673 | A1 * | 6/2009 | Soliman et al. ........... 180/65.1 |
| 2009/0150035 | A1 * | 6/2009 | Soliman et al. ................ 701/54 |
| 2009/0234549 | A1 * | 9/2009 | Silveri et al. .................. 701/70 |
| 2009/0236159 | A1 * | 9/2009 | Shibata et al. ......... 180/65.235 |
| 2009/0326778 | A1 * | 12/2009 | Soliman et al. ................ 701/84 |
| 2010/0102767 | A1 * | 4/2010 | Endo et al. .................. 318/453 |
| 2010/0113214 | A1 * | 5/2010 | Krueger et al. ................ 477/28 |
| 2010/0125021 | A1 * | 5/2010 | Matsubara et al. .............. 477/5 |
| 2010/0151987 | A1 * | 6/2010 | Notsu .............................. 477/3 |
| 2010/0151988 | A1 * | 6/2010 | Tabata et al. .................... 477/3 |
| 2010/0160111 | A1 * | 6/2010 | Yamanaka et al. ............ 477/45 |

FOREIGN PATENT DOCUMENTS

| | | |
|---|---|---|
| DE | 10 2004 043 589 | 4/2006 |
| GB | 2435869 | 9/2007 |
| JP | 2004/052851 | 2/2004 |
| JP | 2004-052851 | 2/2004 |
| JP | 2007/228721 | 9/2007 |
| WO | 2006/080570 | 8/2006 |
| WO | 2008/075502 | 6/2008 |

OTHER PUBLICATIONS

United Kingdom Intellectual Property Office, Search Report for GB0811060.3, Sep. 9, 2008, 1 page.

U.S. Appl. No. 11/766,056, filed Jun. 20, 2007, Soliman et al.

"Land Rover reveals 'Land_E' technology concept for cleaner environment, improved fuel economy," Mar. 16, 2006,<http://www.asiaprnews.com/automotive/land-rover-reveals-land-e-technology-concept-for-cleaner.html>.

* cited by examiner

NEGATIVE DRIVELINE TORQUE CONTROL INCORPORATING TRANSMISSION STATE SELECTION FOR A HYBRID VEHICLE

BACKGROUND AND SUMMARY

Vehicles may be configured with a hybrid propulsion system that utilizes at least two different sources of torque for propelling the vehicle. As one non-limiting example, a hybrid propulsion system for a vehicle may be configured as a hybrid electric vehicle (HEV), wherein an electric motor and an internal combustion engine may be selectively operated to provide the requested propulsive effort. Similarly, during deceleration of the vehicle, the electric motor and engine can be selectively operated to provide vehicle driveline braking in order to recapture kinetic energy of the vehicle. In this way, vehicle efficiency may be increased.

As described by U.S. Pat. No. 6,890,283, the engine may be disconnected from the drive wheels of the vehicle during deceleration by disengaging the transmission. By reducing engine braking during vehicle deceleration, a greater amount of energy may be recaptured by the motor.

The inventors of the present disclosure have recognized a disadvantage with the above approach. In particular, during some conditions, the motor may not be able to provide sufficient driveline braking torque. Therefore, engine braking can be provided in combination with the motor to provide the desired driveline braking torque. However, operating the engine to supplement driveline braking in addition to the motor may reduce the level of energy recaptured during the braking event.

As another approach, the inventors herein have provided a hybrid propulsion system for a passenger vehicle, comprising at least one drive wheel; a first motor coupled to the drive wheel; a second motor; a transmission including a first end coupled to the drive wheel and a second end coupled to the second motor; and a control system configured to control operation of the first and second motor to each provide vehicle braking torque, wherein transmission state is adjusted to control an amount of braking torque provided by the engine in response to an amount of braking torque provided by the first motor and an amount of braking torque provided by the second motor. In this way, a first motor and a second motor may be coordinated to provide sufficient vehicle braking, and the state of the transmission may be adjusted to facilitate the distribution of braking torque between the motors and engine, thereby improving driver feel during deceleration.

As yet another approach described herein, the control system may be configured to vary a relative level of electrical energy generated by the first motor and the second motor in response to an operating condition to generate vehicle braking. In this way, energy recapture during vehicle deceleration may be selectively performed by the first motor, second motor, or both motors while considering operating conditions such as the state of the transmission operatively coupled between the motors, a condition of the energy storage device, and/or the speed of the engine, among others.

It should be appreciated that the various concepts that have been provided in the Background and Summary are non-limiting examples and that these and other approaches will be described in the Detailed Description in greater detail. Additionally, the various approaches described herein and the claimed subject matter are not necessarily limited to addressing the above mentioned issues.

DETAILED DESCRIPTION

A variety of control strategies are disclosed herein to enable coordination of the hybrid propulsion system driveline during vehicle deceleration. In this way, synergies between the different propulsion system components may be achieved, thereby enabling increased fuel efficiency and improved drivability of the vehicle. While the present application is described with reference to an HEV system utilizing an engine, two electric machines, and an automatic transmission, it should be appreciated that the approaches described herein may be applied to some other hybrid propulsion systems.

Figure 1:
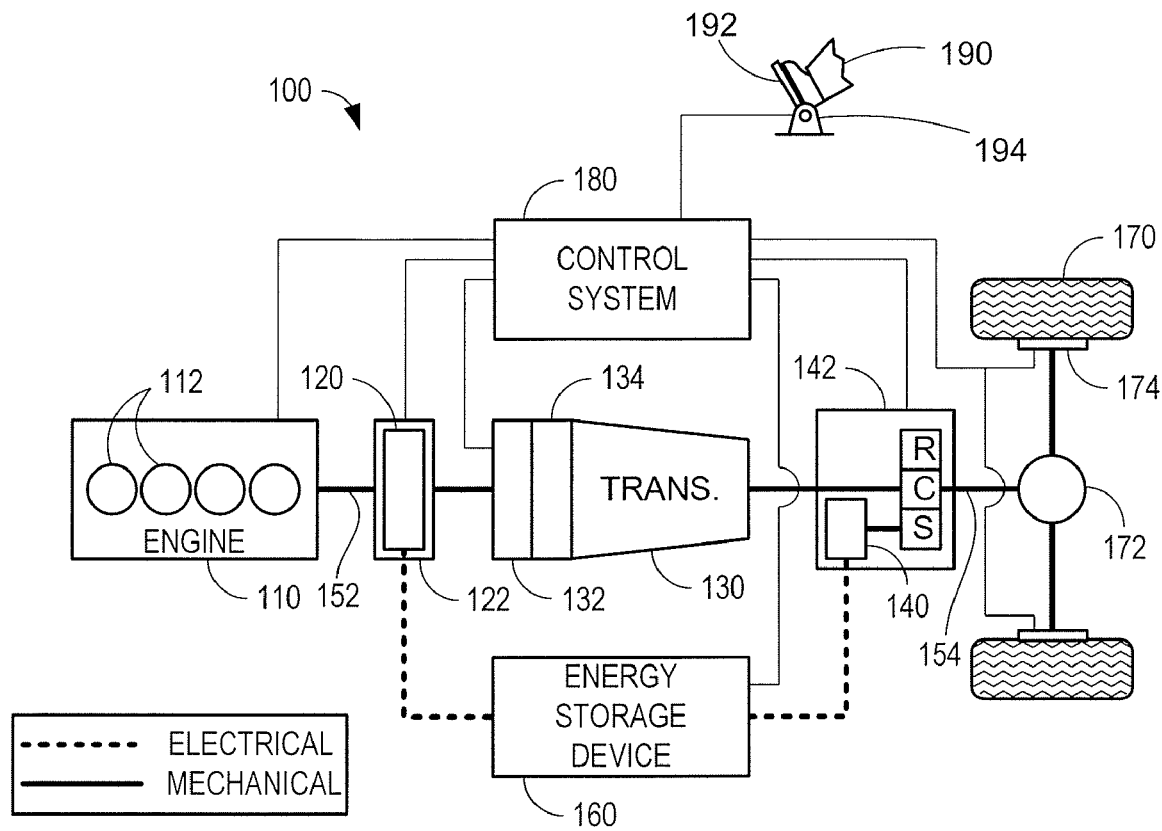
FIG. 1 shows an example hybrid vehicle propulsion system.

With a hybrid propulsion system such as the HEV system shown in FIG. 1, for example, an opportunity exists to coordinate torque ratio selection for the transmission including transmission gear and torque converter state selection in response to the regenerative braking capability of the electric machines. Thus, an energy efficient approach for decelerating the vehicle is possible while maintaining operation of the energy storage device within its energy storage (e.g. state of charge (SOC)) and power exchange limits, thereby enabling further increase in energy efficiency. By coordinating and controlling the powertrain, such as the electric machine torque commands, gear selection, etc., the requested driveline braking force can be achieved while increasing energy recovery.

As described herein, the term deceleration can refer to the various types of vehicle deceleration that may be achieved by the hybrid propulsion system including vehicle braking and hill holding. The present disclosure considers at least the following two types of vehicle deceleration requests. A first deceleration request may include a request to control vehicle acceleration/deceleration without necessarily requiring user input, such as vehicle speed control on a down grade, hill decent control (HDC), and/or cruise control, for example. A second deceleration request may include a request to reduce vehicle speed to either a lower speed or a complete stop based on an input received from a user, such as closed-pedal control, which is indicative of driver demand, or coast down, and/or braking, for example.

These vehicle deceleration requests can be directly requested by the user through the use of a brake system and/or via selection of driveline control. For example, the user can utilize a foot pedal or other user input device to request increased deceleration or vehicle braking. As another example, a user can select or adjust a state of the transmission by selecting a particular gear with regards to a manual transmission or by selecting a particular operating range with regards to an automatic transmission as another approach for increased vehicle deceleration. Furthermore, these requests can be controlled without necessarily requiring user input through the application of control strategies used to achieve specific vehicle functionality such as adaptive cruise control or hill decent control. In either case, the driveline of the hybrid vehicle can be used to provide the requested deceleration in order to increase energy recovery and extend the life of the friction brakes.

With non-hybrid vehicle propulsion systems, the amount of engine braking torque, and hence vehicle deceleration, can be limited at a given vehicle speed where a transmission downshift may not be permitted, for example, due to engine over speed and/or transmission protection. Thus, the driver may resort to applying the friction brakes in these scenarios to achieve the requested vehicle deceleration, since engine braking alone may not facilitate the requested deceleration of the vehicle. Furthermore, if a transmission downshift is initiated in order to increase the level of engine braking, an upshift of the transmission may shortly follow if there was excessive braking torque in the lower gear. As a result, transmission shift hunting may occur with some transmissions due to the lack of a continuous range of authority in the powertrain when regulating the driveline braking torque. Finally, abrupt changes in the driveline braking torque which occur when shifting may be directly perceived by the driver. The various vehicle braking approaches described herein seek to address these issues by taking advantage of the regenerative capability of a hybrid powertrain in coordination with transmission state selection, thereby providing enhanced negative driveline torque control.

FIG. 1 illustrates an example hybrid propulsion system 100 for a vehicle. In this particular example, hybrid propulsion system 100 is configured as an HEV, which may be operated in conjunction with a rear wheel drive (RWD) vehicle platform. However, the approaches described herein may be applied to other vehicle platforms including front wheel drive, four wheel drive, or all wheel drive systems. Hybrid propulsion system 100 includes a powertrain comprising an engine 110, a first electric motor 120, a transmission 130, and a second electric motor 140.

Engine 110 may include one or more combustion chambers or cylinders 112 for combusting a fuel. As one non-limiting example, engine 110 may be operated in what may be referred to as an Atkinson cycle. The engine may be operated in an Atkinson cycle to achieve improved fuel efficiency over similarly sized Otto cycle engines, whereby the electric motors may be operated to assist the engine provide the requested driveline torque, for example, during acceleration of the vehicle. However, in other examples, engine 110 may be operated in an Otto cycle or other suitable combustion cycle. The torque produced by engine 110 may be delivered directly to drive shaft 152. During some or all of the vehicle braking modes described herein, the engine may discontinue combustion of fuel in some or all of the cylinders. In this way, fuel efficiency may be increased during vehicle braking.

As illustrated by FIG. 1, the first electric motor 120 and the second electric motor 140 may be arranged on opposite sides of transmission 130. By varying an operating state of transmission 130, an amount of torque transmitted between driveshafts 152 and 154 via transmission 130 can be varied. Transmission 130 can include a torque converter comprising an impeller 132 and a turbine 134. The transmission may be engaged or disengaged by varying a state of the torque converter to vary the torque transfer between impeller 132 and turbine 134. Furthermore, transmission 130 may include two or more selectable gear ratios that can be used to vary the ratio of speed and/or torque that is exchanged between driveshafts 152 and 154. As one non-limiting example, transmission 130 may include six selectable gears, however, other transmissions having more or less gears may be used. In alternative embodiments, transmission 130 may be configured as a continuously variable transmission (CVT) to enable the transmission to provide continuously variable gear ratios to the driveline. Furthermore, in alternative embodiments, transmission 130 may be configured as a dual-clutch (i.e. powershift) or automatically shifted manual transmission both of which do not use a torque converter.

In some embodiments, motor 140 may be included as part of a motor system 142. As one non-limiting example, motor system 142 may be configured as what may be referred to as an electric rear axle device (ERAD) system, however, other suitable configurations may be used. In FWD applications, motor system 142 could also connected to the final drive of a front axle at the output of the transmission, and would be referred to as an electric front axle drive (EFAD) unit. ERAD system 142 can include any suitable gearing to enable motor 140 to be operated independent of drive shaft 154. For example, as illustrated by FIG. 1, motor system 142 may include a planetary gear set comprising a carrier (C), a sun gear (S), and a ring gear (R). By varying a state of the planetary gear set, an amount of torque exchanged between motor 140 and drive shaft 154 may be varied. In this way, motor 140 selectively supply or absorb torque to drive shaft 154. In alternative embodiments, motor 140 may be coupled directly to drive shaft 154. Furthermore, in alternative embodiments, motor system 142 may be solely used to drive the rear wheels while the engine 110, first electric motor 120 and transmission 130 are solely used to drive the front wheels. In this way, the transmission output is not mechanically coupled to the motor system 142.

In some embodiments, motor 120 may be included as part of a motor system 122. As one non-limiting example, motor system 122 may be configured as what may be referred to as a combined integrated starter/generator (CISG) system. In this particular embodiment, motor 120 is operatively coupled with drive shaft 152 such that rotation of drive shaft 152 results in a corresponding rotation of motor 120 and engine 110. CISG system 122 may be operated to assist starting of engine 110 and/or to generate electrical energy that may be stored in an energy storage device 160. However, it should be appreciated that motor 120 may be configured in a motor system that includes any suitable gearing to enable motor 120 to be selectively operated independent from engine 110. For example a clutch may be used to provide an operative disconnect in between CISG system 122 and engine 110 to reduce frictional torque losses from the engine while the CISG system is used to generate electrical energy.

CISG system 122 and ERAD system 142 may be operated to exchange torque with drive shafts 152 and 154, respectively. For example, CISG system 122 can be operated to supply torque to drive shaft 152 in response to electrical energy received from energy storage device 160. Similarly, ERAD system 142 can be operated to supply torque to drive shaft 154 in response to electrical energy received from energy storage device 160. In this manner, the CISG and/or ERAD can be operated to assist the engine to propel the vehicle.

Furthermore, CISG system 122 and/or ERAD system 142 can be selectively operated to absorb torque from drive shafts 152 and 154, respectively, whereby the energy may be stored at energy storage device 160 or exchanged between CISG system 122 and ERAD system 142. For example, electrical energy generated by the ERAD can be supplied to the CISG to rotate engine 110. Energy storage system 160 may include one or more batteries, capacitors, or other suitable energy storage devices.

Drive shaft 154 may be operatively coupled to one or more wheels 170 via a final drive unit 172. Each of wheels 170 can include a friction brake 174 to provide supplemental braking for deceleration of the vehicle.

A control system 180 may be communicatively coupled to some or all of the various components of hybrid propulsions system 100. For example, control system 180 can receive operating condition information from engine 110 such as engine speed, CISG system 122, transmission 130 including the current gear selected, transmission turbine 134 and drive shaft 154 speeds, torque converter state, ERAD 142, energy storage device 160 including state of charge (SOC) and charge rate, wheels 170 including vehicle speed, and the position of friction brakes 174. Control system 180 can receive a user input via a user input device. For example, control system 180 can receive a vehicle braking request from a user 190 via a pedal 192 as detected by pedal position sensor 194. In some embodiments, control system can identify the angle of inclination or grade of the road surface via an inclinometer or other suitable device.

Further, control system 180 can send control signals to engine 110 to control fuel delivery amount and timing, spark timing, valve timing, throttle position, among other engine operating parameters, CISG system 122 to control the amount of torque exchanged between motor 120 and driveshaft 152, transmission 130 to change gear selection and to control the state of the torque converter, ERAD 142 to control the amount of torque exchanged between motor 140 and driveshaft 154, energy storage device 160 to control the amount of energy received from or supplied to the ERAD and CISG systems, and friction brakes 174 to vary an amount of braking force applied at the wheels 170 as will be described in greater detail herein. It will be appreciated by one of skill in the art in light of the present disclosure that the control system can adjust operating parameters of the various driveline components via electromechanical or electro-hydraulic actuators, or other suitable device.

Control system 180 can include one or more microcomputers, including a microprocessor unit, input/output ports, an electronic storage medium for executable programs and calibration values configured as read only memory chip, random access memory, and/or keep alive memory, and a data bus. Thus, it should be appreciated that control system 180 can execute the various control routines described herein in order to control the operation of hybrid propulsion system 100.

To achieve optimum negative driveline torque control during a braking operation, the control system may be configured to increase and/or maximize energy recovery while reducing and/or minimizing engine braking by utilizing the regenerative braking capability of the electric machines within the energy storage capacity and power exchange limitations of the energy storage device.

Figure 2:
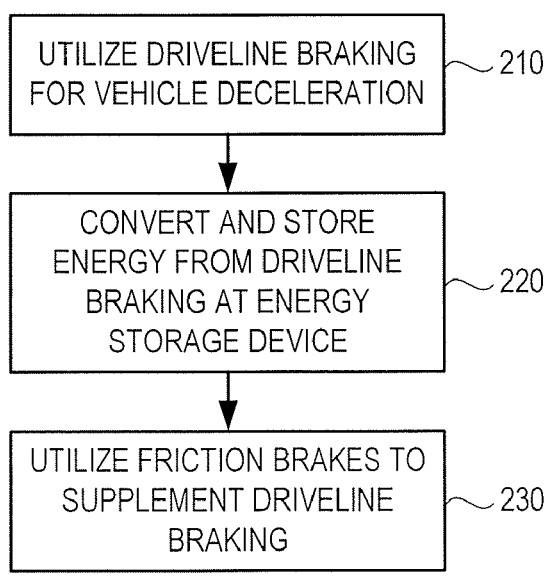
FIG. 2 is a flow chart depicting a high level control routine for achieving vehicle deceleration.

FIG. 2 is a flow chart depicting an example high level control routine that may be performed by the control system to achieve vehicle braking. At 210, the control system can operate one or more of the ERAD, CISG, and/or engine to perform driveline braking to cause vehicle deceleration. Driveline braking will be described in greater detail with reference to FIGS. 3-15. At 220, at least a portion of the energy received from the driveline braking operation can be converted and stored at the energy storage device. At 230, the friction brakes may be controlled by the control system to supplement the driveline braking. Note that control system 180 may include an anti-lock braking system (ABS) or other traction control system that utilizes the friction brakes 174 to supplement the driveline braking as will be described in greater detail herein.

Figure 3:
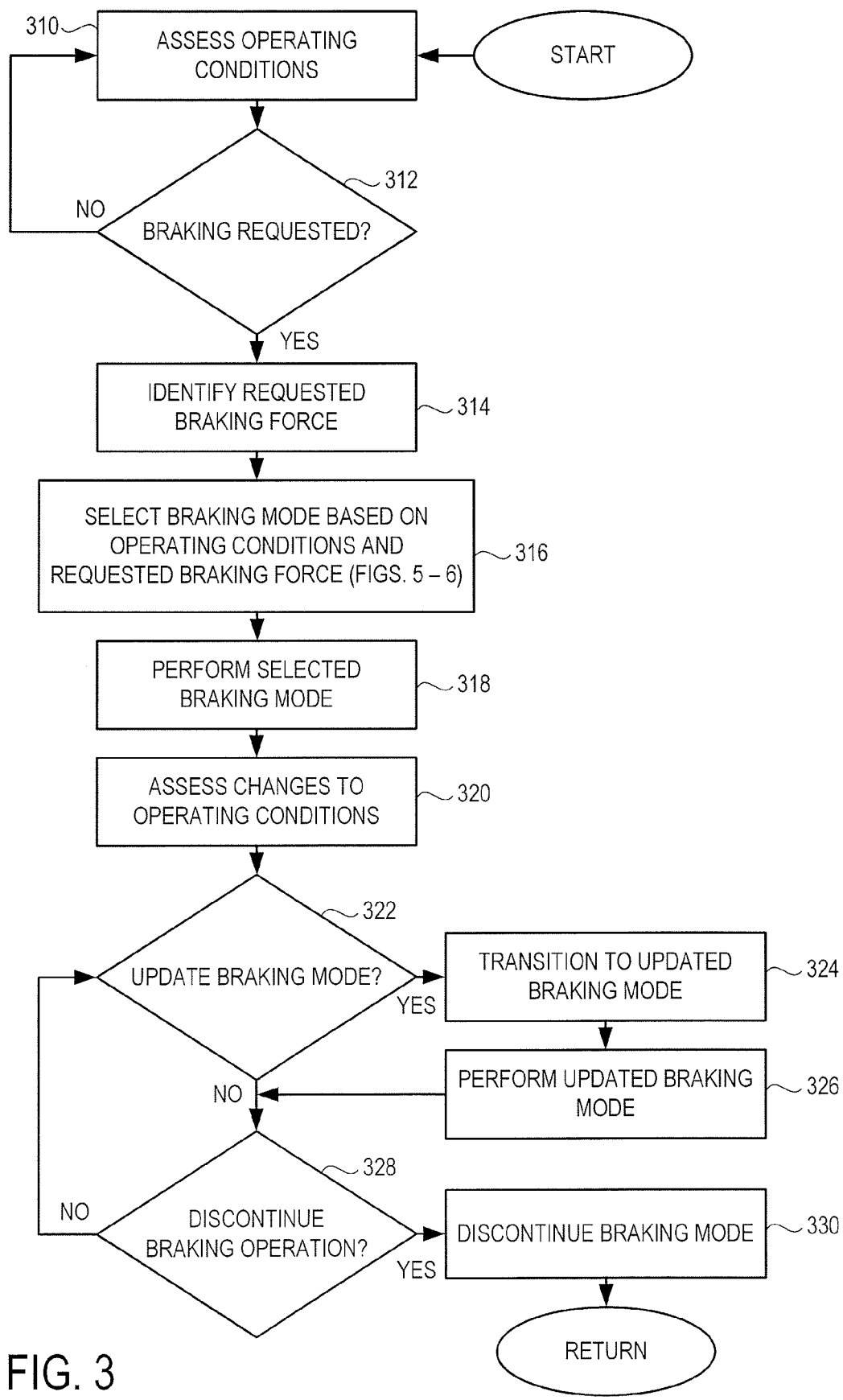
FIG. 3 is a flow chart depicting a control routine for controlling a driveline braking operation.

FIG. 3 is a flow chart depicting an example control strategy for controlling driveline braking of hybrid propulsion system 100. At 310, the control system can assess operating conditions of the vehicle, including current, past, and/or predicted future operating conditions. As described herein, operating conditions may include, but are not limited to, one or more of the following: energy level or state of charge (SOC) of the energy storage device, energy exchange rate with the energy storage device, amount of torque exchanged between the driveline and the ERAD or CISG, the position of a user input device such as brake pedal 192, ambient conditions such as air temperature and pressure, angle of inclination or grade of the road surface, transmission state including selected gear and torque converter state, transmission turbine and output speeds, engine speed, vehicle speed, among other operating states of the engine, CISG, ERAD, transmission, and energy storage device.

At 312 it may be judged whether driveline braking is requested. A vehicle braking request may be initiated by a user and/or by the control system. For example, where the user depresses a brake pedal or activates an input device for requesting a braking operation for the vehicle, the control system can receive the request from the user as shown in FIG. 1. As another example, the control system may request vehicle braking responsive to the operating conditions identified at 310 without receiving a braking request from the user. In other words, the control system may request vehicle braking, for example, during active cruise control, HDC, or other traction control operations. Thus, it should be appreciated that the braking request may originate from the user or from the control system.

If the answer at 312 is no (i.e. no vehicle braking is requested), the routine may return to 310 where the operating conditions may be again assessed until a braking request is initiated by the user or by the control system. Alternatively, if the answer at 312 is yes (i.e. vehicle braking is requested) the requested braking force may be identified at 314. As one example, the amount of braking force requested may be identified by the control system based on the operating conditions assessed at 310 and/or the position or movement of the brake pedal by the user.

At a given vehicle speed, a vehicle driveline braking (i.e. negative driveline torque) request can be interpreted as a desired or a requested braking force for achieving a desired vehicle deceleration. The desired vehicle deceleration and corresponding requested braking force may be described by the following equation:

$$\text{desired vehicle deceleration} = d_{VEH}$$

$$= \frac{F_{B\_DES} - F_{ROAD}}{\left(\frac{W_{veh}}{g}\right)} \Rightarrow F_{B\_DES}$$

$$= d_{VEH}\left(\frac{W_{VEH}}{g}\right) + F_{ROAD}$$

where $F_{B\_DES}$: desired driveling braking force request, $F_{ROAD}$: road load, $$\frac{W_{VEH}}{g}:$$

vehicle mass

As one example, engine braking can be used to achieve the desired driveline braking force via selection of the appropriate transmission state, including the gear and/or torque converter state, in order to regulate the amount of engine braking used to decelerate the vehicle. Thus, engine braking can be described by the following equation:

$$F_{B\_DES} = F_{B\_ENG} = -\frac{T_{ENG} \cdot i_{TQ} \cdot i_G \cdot \eta_G \cdot i_{FD} \cdot \eta_{FD}}{R_{TIRE}}$$

where, $T_{ENG}$: engine braking torque, $i_{TQ}$: torque multiplication by converter, $i_G$: gear ratio, $i_{FD}$: final drive ratio $\eta_G$: transmission gearbox efficiency, $\eta_{FD}$: final drive efficiency, $R_{TIRE}$: effective tire radius By selecting the appropriate gear at a given vehicle speed, the amount of engine braking used to decelerate the vehicle can be increased or decreased within the maximum and minimum engine speed constraints. However, a hybrid propulsion system such as system 100 may be operated to apply one or more driveline braking (i.e. negative torque) sources including the engine, CISG, and ERAD to regulate the driveline braking force. Thus, the braking force applied by the engine, CISG, and the ERAD can be described by the following equations:

$$F_{B\_ENG} = -\frac{T_{ENG} \cdot i_{TQ} \cdot i_G \cdot \eta_G \ldots i_{FD} \cdot \eta_{FD}}{R_{TIRE}},$$

$$F_{B\_CISG} = -\frac{T_{CISG} \cdot i_{TQ} \cdot i_G \cdot \eta_G \ldots i_{FD} \cdot \eta_{FD}}{R_{TIRE}},$$

-continued $$F_{B\_ERAD} = -\frac{T_M \cdot i_{ERAD} \cdot i_{FD} \cdot \eta_{FD}}{R_{TIRE}}$$

where, $F_{B\_ENG}$: braking force from engine, $F_{B\_CISG}$: braking force from CISG, $F_{B\_ERAD}$: braking force from ERAD $T_{ENG}$: engine braking torque, $T_{CISG}$: CISG generating torque, $T_M$: ERAD motor generating torque $\eta_G$: transmission gearbox efficiency, $i_G$: transmission gear ratio, $i_{TQ}$: transmission torque converter torque ratio $i_{ERAD}$: ERAD gear ratio to motor, $\eta_{FD}$: final drive efficiency, $i_{FD}$: final drive ratio The total driveline braking force available for decelerating the vehicle can be described by the following equations as the summation of the above negative torque sources:

$$F_{B\_PT} = F_{B\_ENG} + F_{B\_CISG} + F_{B\_ERAD}$$

$$= \frac{\lfloor(-T_{ENG} - T_{CISG}) \cdot i_{TQ} \cdot i_G \cdot \eta_G - T_M \cdot i_{ERAD}\rfloor \cdot i_{FD} \cdot \eta_{FD}}{R_{TIRE}}$$

or driveline braking torque:

$$T_{B\_PT} = [(-T_{ENG} - T_{CISG}) \cdot i_{TQ} \cdot i_G \cdot \eta_G - T_M \cdot i_{ERAD}] \cdot i_{FD} \cdot \eta_{FD}$$

where the vehicle deceleration = $d_{VEH}$ $$= \frac{F_{B\_PT} - F_{ROAD}}{\left(\frac{W_{VEH}}{g}\right)}$$

In this way, the requested braking force can be identified for a given vehicle deceleration that may be requested by the user and/or the control system of the vehicle.

At 316, a driveline braking mode may be selected based on the operating conditions assessed at 310 and the requested braking force identified at 314. For a given requested braking force ($F_{B\_DES}$), or alternatively a requested negative driveline torque, the control system may apply a rule-based state machine scheme in order to increase and/or maximize energy recovery while achieving the requested driveline braking force. A braking mode may be selected based on the magnitude of driveline braking force requested, current SOC conditions and/or power exchange limitations of the energy storage device, among other limitations of the driveline components.

A braking mode may be selected by the control system from a plurality of braking modes shown in greater detail by FIGS. 7, 9, 11, and 13. As one example, the braking mode may be selected by the control system in response to stored values, which may be represented by a driveline braking mode shown in FIG. 5. The control system may also utilize adaptive learning to select a suitable braking mode based on previous driveline braking response.

Figure 4:
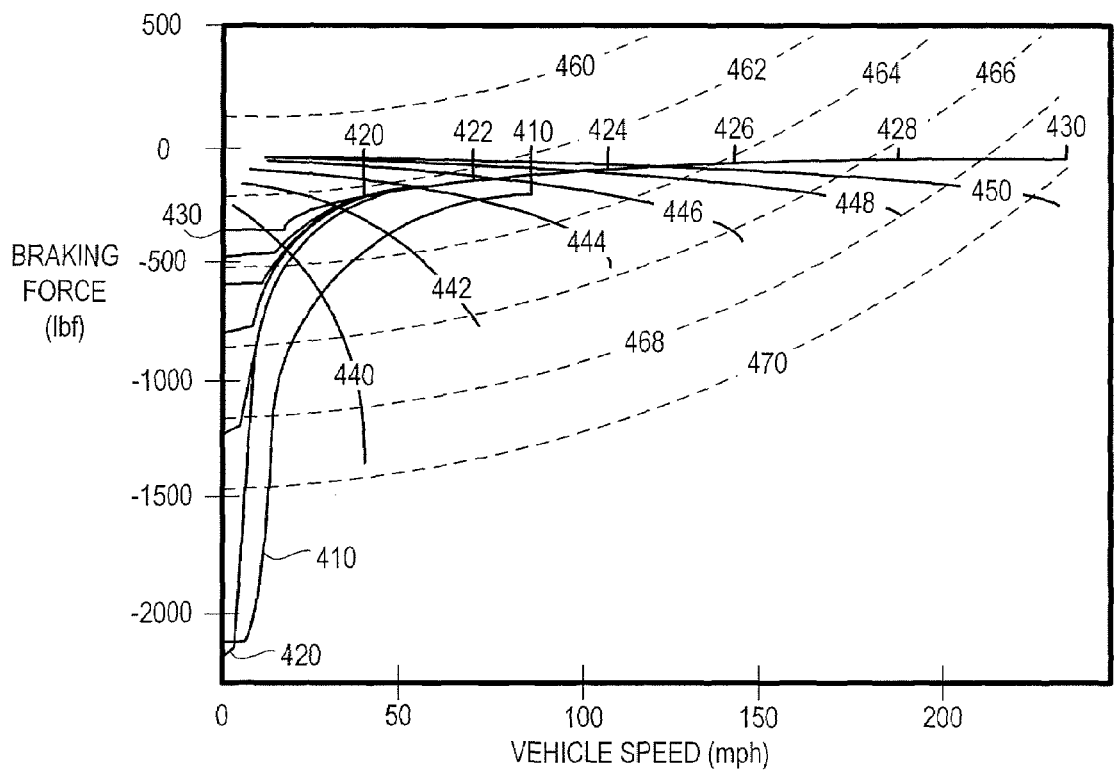
FIG. 4 is a graph illustrating maximum braking forces that may be achieved by the various components of an example hybrid propulsion system.

Note that the level of braking force provided by the CISG and the ERAD may be constrained by their respective limitations. Additionally, the energy storage capacity (e.g. battery state of charge (SOC)) and/or power exchange rate limitations of the energy storage device may further limit the level of braking force that may be provided by the CISG and ERAD. As one example, the driveline braking capabilities of both the CISG and ERAD may decrease with increasing vehicle speed as depicted by the graph of FIG. 4. Furthermore, the braking capabilities of the CISG and the engine may also vary as a function of the transmission state at a given vehicle speed since the engine speed will increase or decrease in response to transmission shifting.

FIG. 4 provides a graph depicting braking limitations of the ERAD, CISG, and engine with varying vehicle speeds and transmission states for hybrid propulsion system 100. In particular, an example of the maximum braking force that may be provided by the ERAD with varying vehicle speed is shown at 410. A range of maximum braking force that may be provided by the CISG is shown at 420-430 based on the particular transmission gear selected. For example, a maximum braking force that may be provided by the CISG when a first gear of the transmission is selected is shown at 420. Examples of the maximum braking force that may be provided by the CISG when one of a second, third, fourth, fifth, and sixth gear of the transmission is selected are shown at 422, 424, 426, 428, and 430, respectively. As depicted by the graph of FIG. 4, the maximum amount of braking force that may be provided by the CISG decreases with increasing vehicle speeds and is greater at lower gears than at higher gears.

FIG. 4 also shows a range of braking forces 440-450 that may be provided by the engine with varying vehicle speeds. For example, a maximum braking force that may be provided by the engine when a first gear of the transmission is selected is shown at 440. Examples of the maximum braking force that may be provided by the engine when one of a second, third, fourth, fifth, and sixth gear of the transmission is selected are shown at 442, 444, 446, 448, and 450, respectively. As depicted by the graph of FIG. 4, the amount of braking force that may be provided by the engine increases with increasing vehicle speeds and is greater at lower gears than at higher gears. Note that the selected transmission state (e.g. transmission gear and/or torque converter state) can take into account engine speed limits (e.g. lug and/or overspeed) in addition to friction element energy limitations at a given vehicle speed. Thus, the capabilities of the CISG and engine to provide driveline braking may be also constrained by the maximum and/or minimum allowable engine speeds.

FIG. 4 also depicts road load for varying road grades and changing vehicle speed. For example, a 0% grade is shown at 460, a −5% grade is shown at 462, a −10% grade is shown at 464, a −15% grade is shown at 466, a −20% grade is shown at 468, and a −25% grade is shown at 470. Note that a negative grade as described herein refers to a vehicle traveling down an inclined surface.

Thus, FIG. 4 illustrates example limitations of the engine, CISG, and ERAD of hybrid propulsion system 100 with varying vehicle speed and transmission state. Note that these limitations have been provided as an example and may vary with the particular driveline configuration and driveline actuators utilized by the control system. As shown in FIG. 4, during some conditions two or more of the engine, CISG and ERAD may be operated to provide the requested driveline braking force if the maximum braking force of any one of the driveline components is exceeded. Note that the friction brakes may also be used to reduce driveline braking in order to avoid limitations of the various driveline components. Thus, particular combinations of the engine, CISG, and ERAD, which are defined herein by several different braking modes A-D, may be used to provide the requested braking force as will be described in greater detail with reference to FIGS. 6-14 with or without requiring operation of the friction brakes. In this way, the limitations on the amount of driveline braking force provided by each of the engine, CISG, and ERAD may be considered when selecting a particular braking mode so that the requested driveline braking force is achieved.

Figure 5:
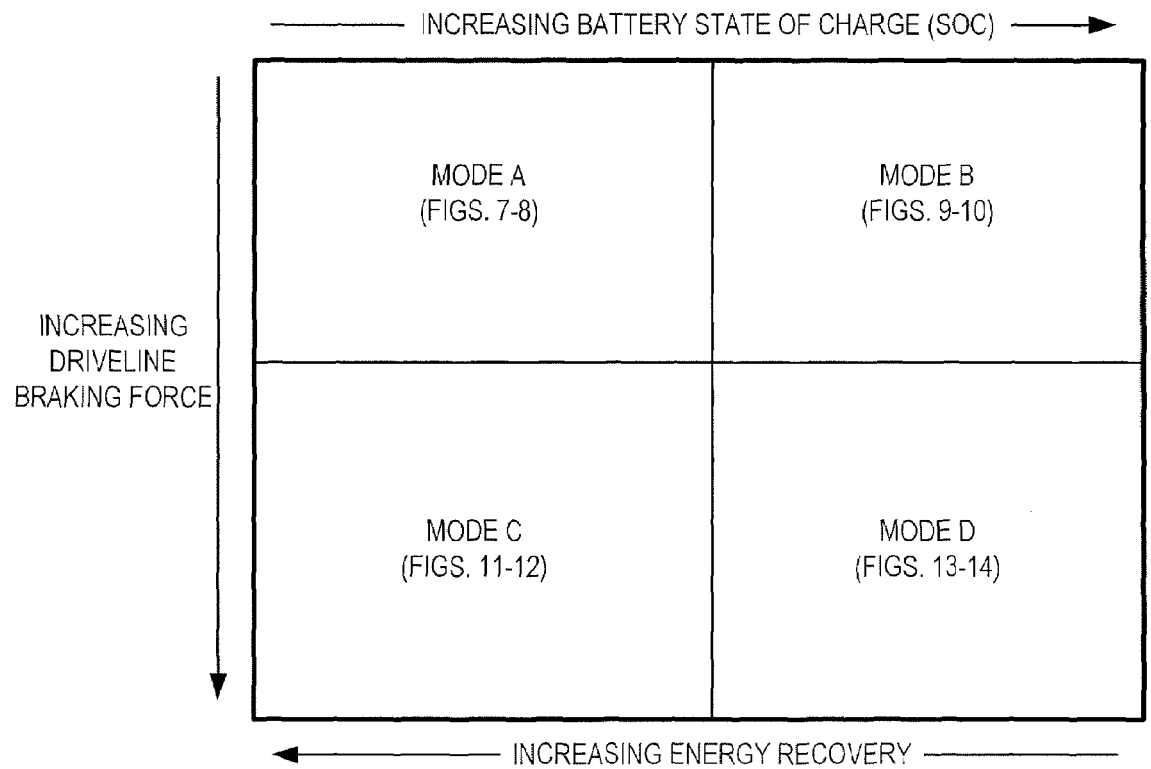
FIG. 5 is mode map representing the various braking modes that may be performed by an example hybrid propulsion system.

FIG. 5 illustrates a mode map representing an example control strategy that may be performed by the control system for selecting a braking mode in response to the particular operating conditions of the vehicle. Each of the braking modes can be selected to provide vehicle driveline braking in response to the energy storage and energy exchange limitations of the energy storage device, while also avoiding conditions where limitations of a particular driveline component are exceeded, for example, as described with reference to FIG. 4.

The example mode map of FIG. 5 includes four different mode regions representing conditions where one of modes A-D may be performed. However, it should be appreciated that in some embodiments, the control system may select from a group of braking modes having greater than or less than four modes. For example, the control system may be configured to select between only two or three different braking modes. The vertical axis of the mode map corresponds to the requested driveline braking force and the horizontal axis of the mode map corresponds to the amount of energy recovered from the braking operation and/or the state of charge of the energy storage device (e.g. a battery).

The vehicle control system can utilize the mode map of FIG. 5 to select a braking mode in response to the requested driveline braking force, the battery SOC, and/or the rate of energy recovery. For example, Mode B may be selected during conditions of a higher battery SOC, while Mode A may be selected during conditions of a lower battery SOC. Note that in this example, the energy recovered by the hybrid propulsion system during the braking operation where Mode A is performed can be greater than during a braking operation where Mode B is performed, as indicated by the mode map. As another example, Mode A may be selected during conditions of a lower requested driveline braking force and a lower battery SOC, while Mode C may be selected during conditions of a higher requested driveline braking force and a lower battery SOC. Selection of the driveline braking mode will be described in greater detail with reference to FIG. 6.

Returning to FIG. 3, at 318, the selected braking mode selected at 318 may be performed as will be describe in greater detail with reference to FIGS. 7-15. At 320, changes to the operating conditions may be identified by the control system. At 322, it may be judged whether the braking mode selected at 316 should be updated based on the change of operating conditions identified at 320. For example, the control system may compare a change in the operating conditions to the mode map to identify whether a different braking mode is to be performed. As one non-limiting example, the amount of driveline braking force requested may have changed, for example, in response to a change of the user input or in response to a change in the operating conditions assessed by the control system. As another example, the driveline braking mode may be updated in response to a thermal condition and/or an efficient operating range of one of the motors as described in FIG. 16.

If the answer at 322 is yes (i.e. the braking mode is to be updated), the braking mode may be updated in response to the change in operating conditions, whereby the control system may transition the vehicle to an updated braking mode at 324. For example, the control system may adjust one or more operating parameters of the vehicle to transition between one of modes A, B, C, or D to another one of modes A, B, D, or D. At 326, the updated braking mode may be performed.

Alternatively, if the answer at 322 is no (i.e. the braking mode is not to be updated) or from 326, the control system may judge whether the braking operation is to be discontinued. For example, the control system may judge that the braking operation is to be discontinued when driveline braking is no longer requested either by the user or by the control system. As one example, the control system may judge that the braking operation performed at 318 or 326 is to be discontinued when the user removes their foot from the brake pedal or discontinues their braking request. As another example, the control system may discontinue the braking operation when the operating conditions are changed such that braking of the vehicle is no longer requested, such as in response to a change in road surface grade.

If the answer at 328 is yes (i.e. the braking operation is to be discontinued), the control system may discontinue the braking operation at 330. The routine may then return to 310 as described above. Alternatively, if the answer at 328 is no (i.e. the braking operation is to be continued), the routine may return to 322 where the braking mode is continued and where it may be judged whether the braking mode is to be updated. In this way, the selected braking mode may be adjusted in response to changes in operating conditions.

As described above, the routine depicted by FIG. 3 may be used to achieve driveline braking of a hybrid vehicle by utilizing one or more braking modes. In this way, two or more sources of braking torque may be coordinated while providing increased energy recovery and considering the various limitations of the driveline components.

Figure 6:
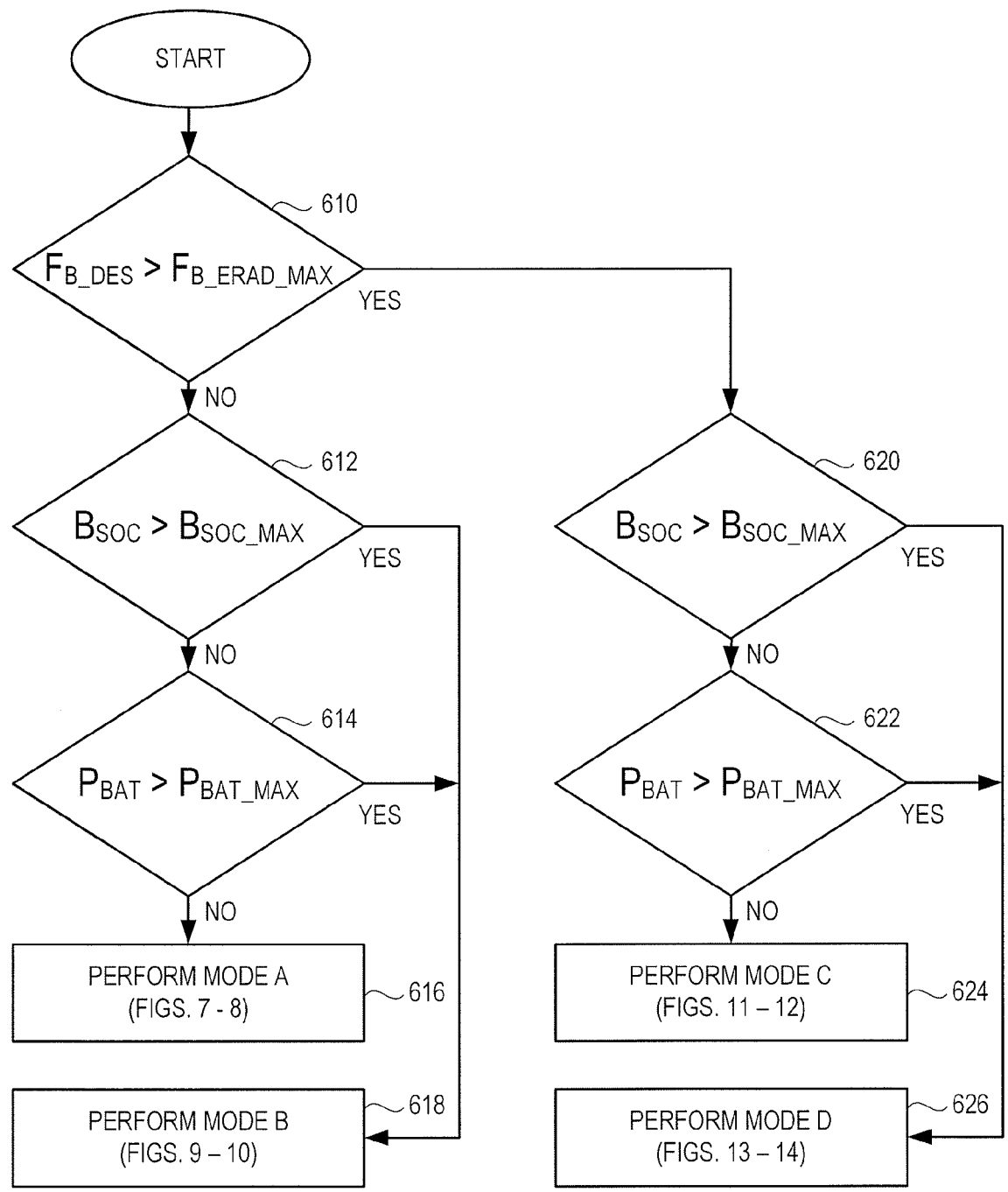
FIG. 6 is a flow chart depicting a control routine for selecting a driveline braking mode.

FIG. 6 is a flow chart depicting an example control strategy for selecting a braking mode, for example, as performed at 316. At 610 it may judged whether the requested or desired braking force ($F_{B\_DES}$) is greater than the maximum braking force of the ERAD ($F_{B\_ERAD\_MAX}$). If the answer at 610 is no, it may be judged at 612 whether the state of charge of the energy storage device ($B_{SOC}$) is greater than the maximum or a threshold state of charge of the energy storage device ($B_{SOC\_MAX}$) or it may be judged at 614 whether the power supplied to the energy storage device ($P_{BAT}$) is greater than the energy exchange limitation of the energy storage device ($P_{BAT\_MAX}$).

Note that in an alternative embodiment the control system may also take into account thermal limits of the CISG & ERAD in selecting a braking mode. For example, where during a braking operation, the ERAD reaches or exceeds a thermal limit, the CISG may be operated to provide increased braking so that the braking provided by the ERAD may be reduced. Also, generating efficiencies of both the CISG & ERAD could also be considered when selecting a braking mode. For example, the ERAD may be operated to provide vehicle braking within an efficient operating range, whereby the CISG may be operated to provide supplemental braking that exceeds the efficient operating range of the ERAD.

If the answers at 612 and 614 are no, mode A may be performed at 616. During mode A operation, the ERAD may be controlled to provide the requested driveline braking force and electrical energy generated by the ERAD may be stored at the energy storage device, for example, as described with reference to FIGS. 7 and 8.

Alternatively, if the answer at 612 or 614 is yes, mode B may be performed at 618. During mode B operation, the ERAD may be controlled to provide the requested driveline braking force. A first portion of the electrical energy generated by the ERAD may be stored at the energy storage device and a second portion of the electrical energy may be supplied to the CISG where it may be used to supply torque to drive shaft 152, thereby providing kinetic energy to engine 110. For example, the CISG may be operated to increase the rotational energy of the engine. By varying the relative ratio of the first portion of energy supplied to the energy storage device and the second portion of energy supplied to the CISG, the energy storage capacity and energy exchange limitations of the energy storage device may be avoided. Mode B will be described in greater detail with reference to FIGS. 9 and 10.

Alternatively, if the answer at 610 is yes (i.e. the requested braking force is greater than the maximum or threshold braking force that is to be provided by the ERAD), the routine can proceed to 620 and 622. At 620, it may be judged whether the state of charge of the energy storage device ($B_{SOC}$) is greater than the maximum or a threshold state of charge of the energy storage device ($B_{SOC\_MAX}$) or it may be judged at 622 whether the power supplied to the energy storage device ($P_{BAT}$) is greater than the energy exchange limitation of the energy storage device ($P_{BAT\_MAX}$).

If the answer at 620 and 622 are no, mode C can be performed at 624. During mode C operation, torque can be transmitted from the wheels through the transmission to the engine and CISG. In some examples, both the CISG and ERAD can be controlled to absorb torque from the driveline, where it may be converted and stored at the energy storage device. It should be appreciated that mode C can be used to provide the greatest driveline braking force since the engine, CISG, and ERAD may be operated to provide driveline braking. Mode C will be described in greater detail with reference to FIGS. 11 and 12.

Alternatively, if the answer at 620 or 622 is yes, mode D can be performed. During mode D operation, substantially all of the driveline braking can be provided by the engine. By discontinuing driveline braking by the CISG and ERAD, driveline braking may be performed by the engine without producing electrical energy during the braking operation. For example, mode D can be performed where a threshold or maximum SOC of the energy storage device has be reached or exceeded. Mode D will be described in greater detail with reference to FIGS. 13 and 14.

The various braking modes depicted in FIGS. 5 and 6 will be described in greater detail with reference to FIGS. 7-14. In particular, FIGS. 7, 9, 11, and 13 provide schematic illustrations of energy flows for hybrid propulsion system 100 for each of modes A-D. In the examples of FIGS. 7-14, the CISG is described as electric motor 1 (E/M 1), the ERAD as electric motor 2 (E/M 2), and the energy storage device is configured as a battery.

Mode A

Figure 7:
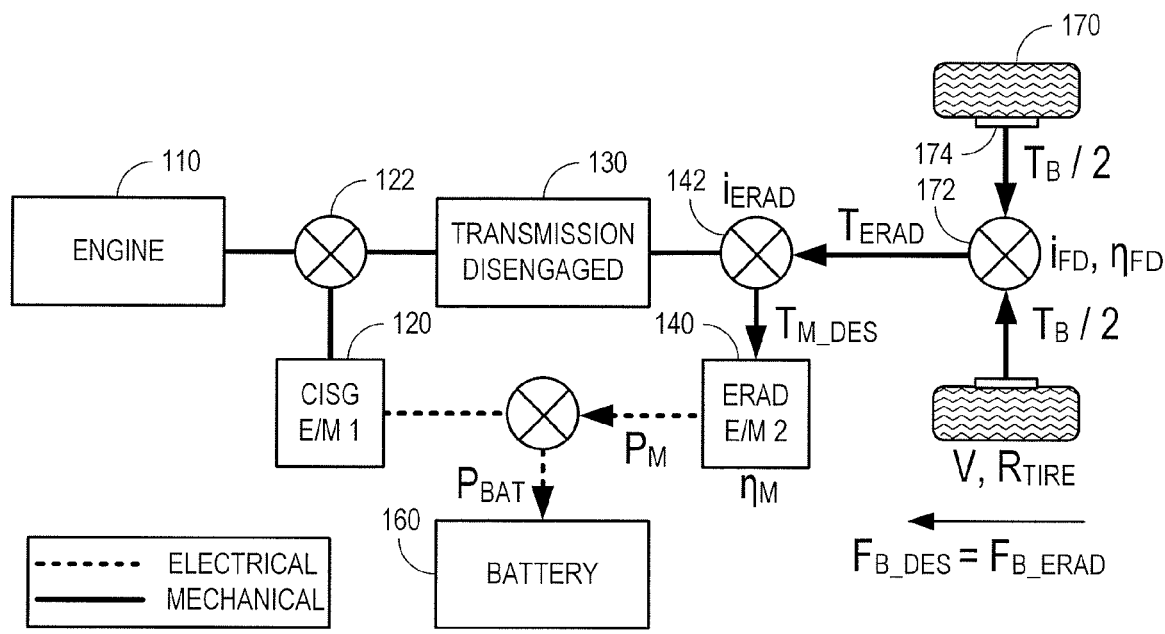
FIG. 7 is a schematic illustration of the energy flow paths for a first braking mode of an example hybrid propulsion system.

FIG. 7 shows a schematic depiction of hybrid propulsion system 100 performing braking mode A. As shown schematically by FIG. 7, braking mode A includes the use of only the ERAD to achieve the requested braking force, whereby the ERAD converts the braking force into energy that may be stored by the energy storage device. Thus, the ERAD provides battery charging during the mode A braking operation while the engine and CISG are decoupled from the drive wheels.

Figure 8:
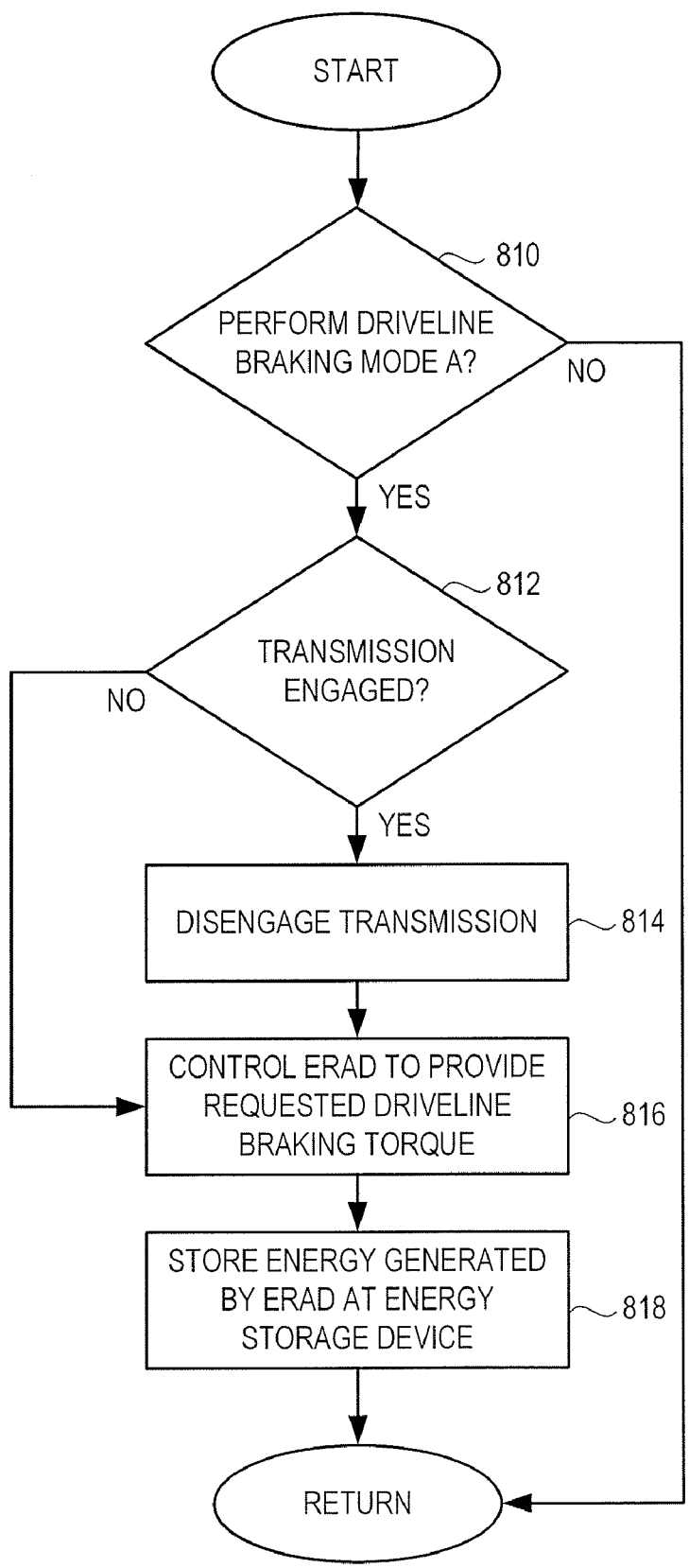
FIG. 8 is a flow chart depicting a control routine for the first braking mode.

As described above with reference to FIGS. 5 and 6, if the current battery SOC is less than a threshold SOC, the battery power limitations are less than a threshold, and the requested driveline braking force is within the capability of the ERAD, mode A may be performed. Mode A can be advantageously performed during these conditions to improve energy recovery over modes B, C, and D since kinetic energy received from the drive wheels are not used to rotate the engine. When operating in braking mode A, the transmission is disengaged and the torque absorbed by the ERAD can be controlled in order to achieve the requested driveline braking force within the battery power absorption limits. The level of ERAD braking force can be described by the following equation:

$$F_{B\_DES} = F_{B\_ERAD}$$
$$= -\frac{T_{M\_DES} \cdot i_{ERAD} \cdot i_{FD} \cdot \eta_{FD}}{T_{TIRE}} \Rightarrow T_{M\_DES}$$
$$= -\frac{F_{B\_DES} \cdot R_{TIRE}}{i_{ERAD} \cdot i_{FD} \cdot \eta_{FD}}$$

where, $F_{B\_DES}$: desired driveline braking force, $F_{B\_ERAD}$: braking force from ERAD $T_{M\_DES}$: desired ERAD generating torque, $i_{ERD}$: ERAD gear ratio to motor, $\eta_{FD}$: final drive efficiency, $i_{FD}$: final drive ratio, $R_{TIRE}$: effective tire radius FIG. 8 is a control routine that may be performed by the control system to achieve driveline braking via mode A. At 810 it may be judged whether driveline braking is to be performed in mode A. If the answer at 810 is no, the routine may return. Alternatively, if the answer at 810 is yes, it may then be judged whether the transmission is engaged. As one example, it may be judged that the transmission is engaged when the transmission transmits torque between drive shaft 152 and 154, for example, where the transmission is in a gear other than neutral.

If the answer at 812 is yes (i.e. the transmission is engaged), the control system can disengage the transmission at 814 by increasing the slip in the torque converter and by transitioning the transmission into neutral. For example, the transmission can be fully disengaged in mode A. Alternatively, if the answer at 812 is no or from 814 where the transmission is disengaged, the ERAD may be controlled at 816 to provide the requested driveline braking force (or torque). For example, the control system may adjust an actuator of the ERAD to increase the torque absorbed from the driveline by the ERAD. At 818, the energy generated by the ERAD in response to the amount driveline braking it provides may be stored at the battery or other energy storage device. Finally, the routine may return.

Mode B

Figure 9:
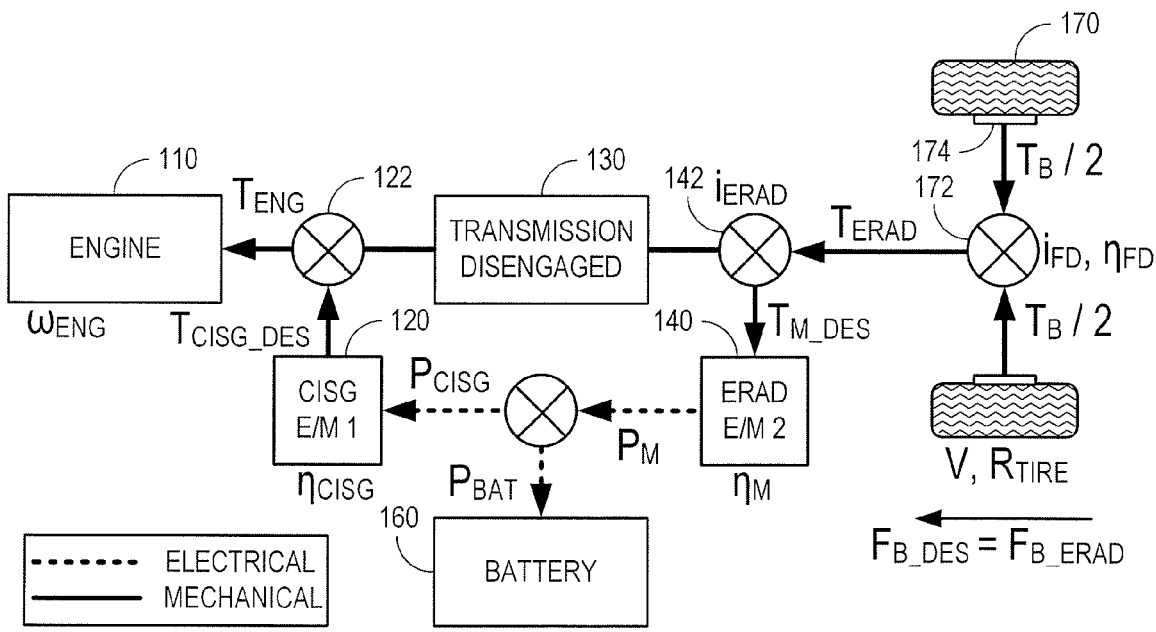
FIG. 9 is a schematic illustration of the energy flow paths for a second braking mode of an example hybrid propulsion system.

FIG. 9 shows the energy flows of hybrid propulsion system 100 while performing braking mode B. Braking mode B again includes the use of the ERAD to provide the requested braking force, whereby the ERAD converts the energy generated by the braking force into a first portion and a second portion. The first portion of the energy produced by the ERAD may be stored by the energy storage device. A second portion of the energy produced by the ERAD may be used to drive the CISG, which in turn can rotate the engine. Thus, the ERAD provides battery charging and powers the CISG during the mode B braking operation. The transmission is disengaged during mode B so that torque is not transmitted to the engine and CISG. This prevents any braking force from the engine and CISG to be transmitted to the wheels. In order to achieve the requested driveline braking force without violating the battery's SOC and power limits, the CISG can be used to dissipate any extra braking energy produced by the ERAD by supplying torque to driveshaft 152, thereby increasing the kinetic energy of the engine. In other words, the ERAD generating torque can be controlled to meet the requested driveline braking force and the CISG motoring torque can be controlled to regulate battery power and SOC by dissipating excess energy through the engine as directed by the following equations $$F_{B\_DES} = F_{B\_ERAD}$$
$$= -\frac{T_{M\_DES} \cdot i_{ERAD} \cdot i_{FD} \cdot \eta_{FD}}{R_{TIRE}} \Rightarrow T_{M\_DES}$$
$$= -\frac{F_{B\_DES} \cdot R_{TIRE}}{i_{ERAD} \cdot i_{FD} \cdot \eta_{FD}}$$

$$P_{BAT} = P_{CISG} + P_M \Rightarrow T_{CISG\_DES}$$
$$= \frac{P_{BAT} - P_M}{\omega_{ENG} \cdot \eta_{CISG}}, T_{ENG\_DES} - T_{CISG\_DES},$$

where $T_{CISG\_DES}$: desired CISG motoring torque, $P_{BAT}$: desired battery power (f(SOC)), $P_M$: desired ERAD power, $P_{CISG}$: desired CISG power, $\omega_{ENG}$: engine speed, $\eta_{CISG}$: CISG efficiency It should be appreciated that braking mode B will typically recover less energy during a similar braking operation than mode A, since the CISG dissipates a portion of the recovered energy to reduce the burden on the energy storage device.

Figure 10:
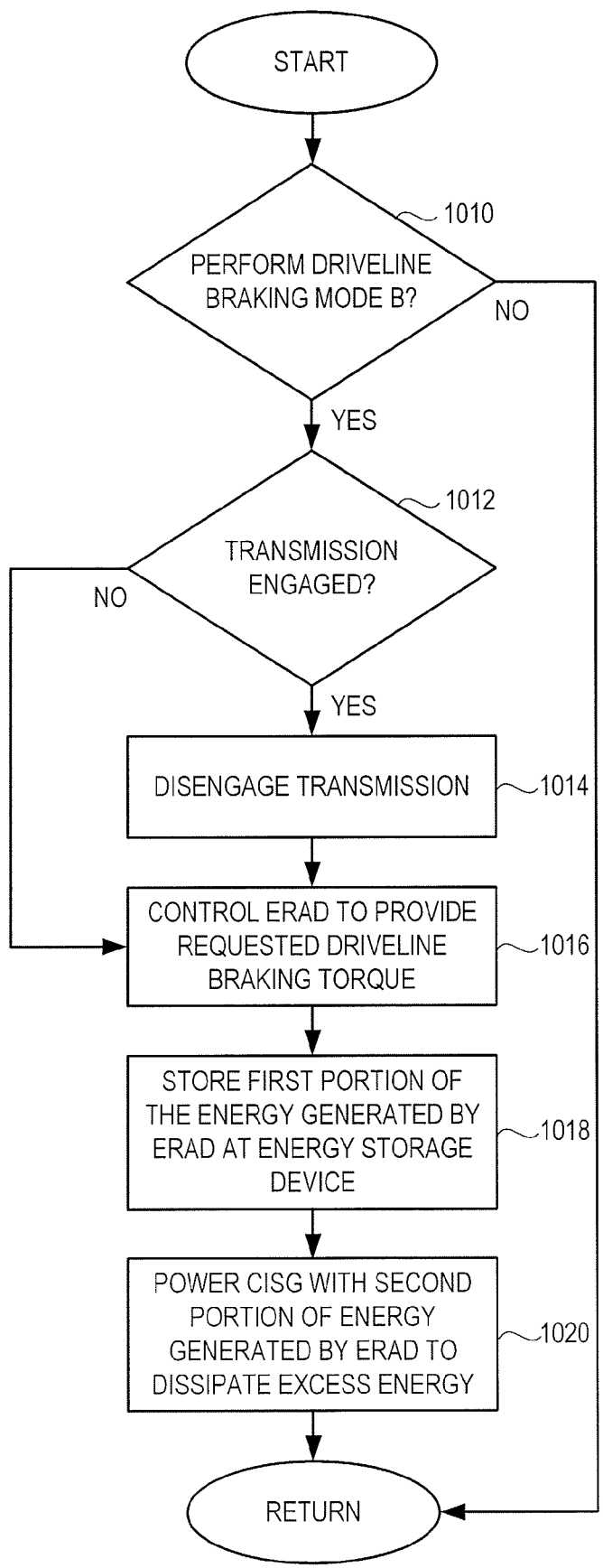
FIG. 10 is a flow chart depicting a control routine for the second braking mode.

FIG. 10 is a control routine that may be performed by the control system to achieve driveline braking via mode B. At 1010 it may be judged whether driveline braking is to be performed via mode B. If the answer at 1010 is no, the routine may return. Alternatively, if the answer at 1010 is yes, it may then be judged whether the transmission is engaged at 1012.

If the answer at 1012 is yes (i.e. the transmission is engaged), the control system can disengage the transmission at 1014 by increasing the slip in the torque converter and by transitioning the transmission into neutral. For example, the transmission can be fully disengaged in mode B. Alternatively, if the answer at 1012 is no or from 1014 where the transmission is disengaged, the ERAD may be controlled at 1016 to provide the requested driveline braking force (or torque). At 1018, a first portion of the energy generated by the ERAD may be stored at the battery or other energy storage device. At 1020, a second portion of the energy generated by the ERAD can be used to power the CISG, thereby dissipating excess energy that cannot be absorbed by the energy storage device. Finally, the routine may return.

Mode C

Figure 11:
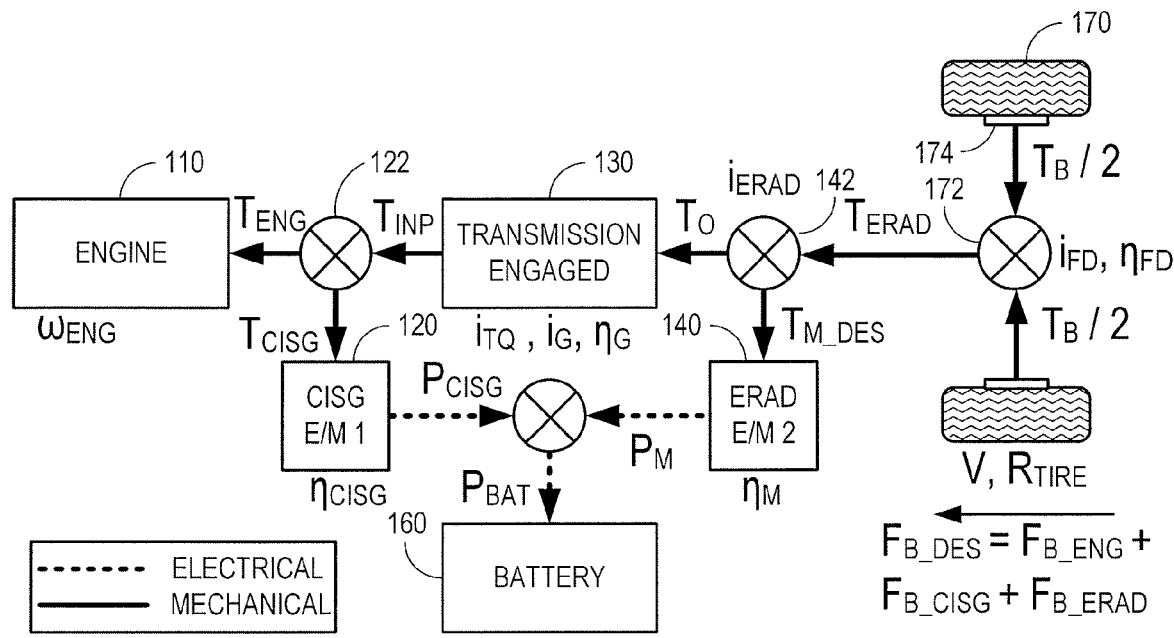
FIG. 11 is a schematic illustration of the energy flow paths for a third braking mode of an example hybrid propulsion system.

As described with reference to FIG. 6, the control system can select braking mode C if the requested driveline braking force is greater than the braking capability of the ERAD and if the energy storage device is within its energy storage and energy exchange limitations. FIG. 11 is schematic illustration of the energy flows during performance of driveline braking mode C. Depending on the particular configuration of the ERAD system, it may not be able to provide the requested driveline braking force during all vehicle braking conditions, the transmission can be engaged so that the braking capabilities of the engine and CISG may also be utilized. The requested driveline braking force can be achieved by increasing and/or maximizing the braking contributions from the ERAD and/or CISG while also reducing and/or minimizing the braking contribution from the engine. In other words, engine braking can be reduced by selecting the highest gear possible and delaying downshifts in order to maximize energy recovery, for example, as described with reference to FIG. 15.

For a given gear ratio of the transmission, the ERAD and CISG generating torques in be controlled to supplement the engine braking to meet the requested driveline braking force. In order to meet the requested braking force, the total desired driveline braking force may first be distributed between a desired ERAD braking force and a desired transmission output braking force, where the ERAD braking force is commanded within its maximum or threshold capability, for example, as directed by the following equations:

$$F_{B\_DES} = F_{B\_ENG} + F_{B\_CISG} + F_{B\_ERAD} = F_{B\_TO\_DES} + F_{B\_ERAD}$$

where $$\Rightarrow T_{M\_DES} = -\frac{F_{B\_ERAD} \cdot R_{TIRE}}{i_{ERAD} \cdot i_{FD} \cdot \eta_{FD}} \leq T_{M\_MAX}$$

$F_{B\_DES}$: desired driveline braking force, $F_{B\_TO\_DES}$: desired transmission output braking force $T_{M\_MAX}$: max ERAD generating torque In order to increase energy recovery and achieve the desired transmission output braking force, the highest gear (lowest ratio) can be selected such that engine braking is reduced and the CISG braking force is increased as described by the following equation: since $$F_{B\_TO\_DES} = F_{B\_ENG} + F_{B\_CISG}$$
$$= F_{B\_CISG}$$
$$= F_{B\_DES} - F_{B\_ERAD}$$
$$= \frac{(-T_{ENG} - T_{CISG\_DES}) \cdot i_G \cdot \eta_G \cdot i_{FD} \cdot \eta_{FD}}{R_{TIRE}} \Rightarrow$$

$$\min(i_G : F_{B\_TO} \,|_{T_{CISG\_DES}=0} < F_{B\_TO\_DES}$$
$$F_{B\_TO\_DES} \leq F_{B\_TO} \,|_{T_{CISG\_DES}=max\ capability})$$

in other words select lowest gear ratio, $i_G$, such that $F_{B\_TO} \geq F_{B\_TO\_DES}$ while maximizing $T_{CISG\_DES}$ where $T_{ENG}$: actual engine braking torque, $T_{CISG\_DES}$: desired CISG generating torque $F_{B\_TO\_DES}$: desired transmission output braking force, $F_{B\_TO}$: actual transmission output braking force, $F_{B\_ERAD}$: braking force from ERAD Note that as the ERAD and/or CISG braking capabilities decrease, for example, with increasing SOC of the energy storage device, engine braking may be increased to achieve the requested driveline braking force by downshifting the transmission. Thus, as the battery SOC increases, the driveline braking contribution can be transitioned towards more engine braking and less braking from the CISG and ERAD. Note that the transmission can be downshifted to the lower gear to increase engine braking as long as the maximum or threshold engine speed limits are not violated.

In terms of energy recovery, braking mode C can provide substantial battery charging capability. However, the amount of energy recovered may be reduced with each downshift of the transmission since engine braking may be increased proportionally. Note that mode C may be used to achieve the highest braking capability of the other modes since the engine, ERAD, and CISG can be used to provide negative driveline torque as long as the operating state of the energy storage device permits braking mode C operation.

Figure 12:
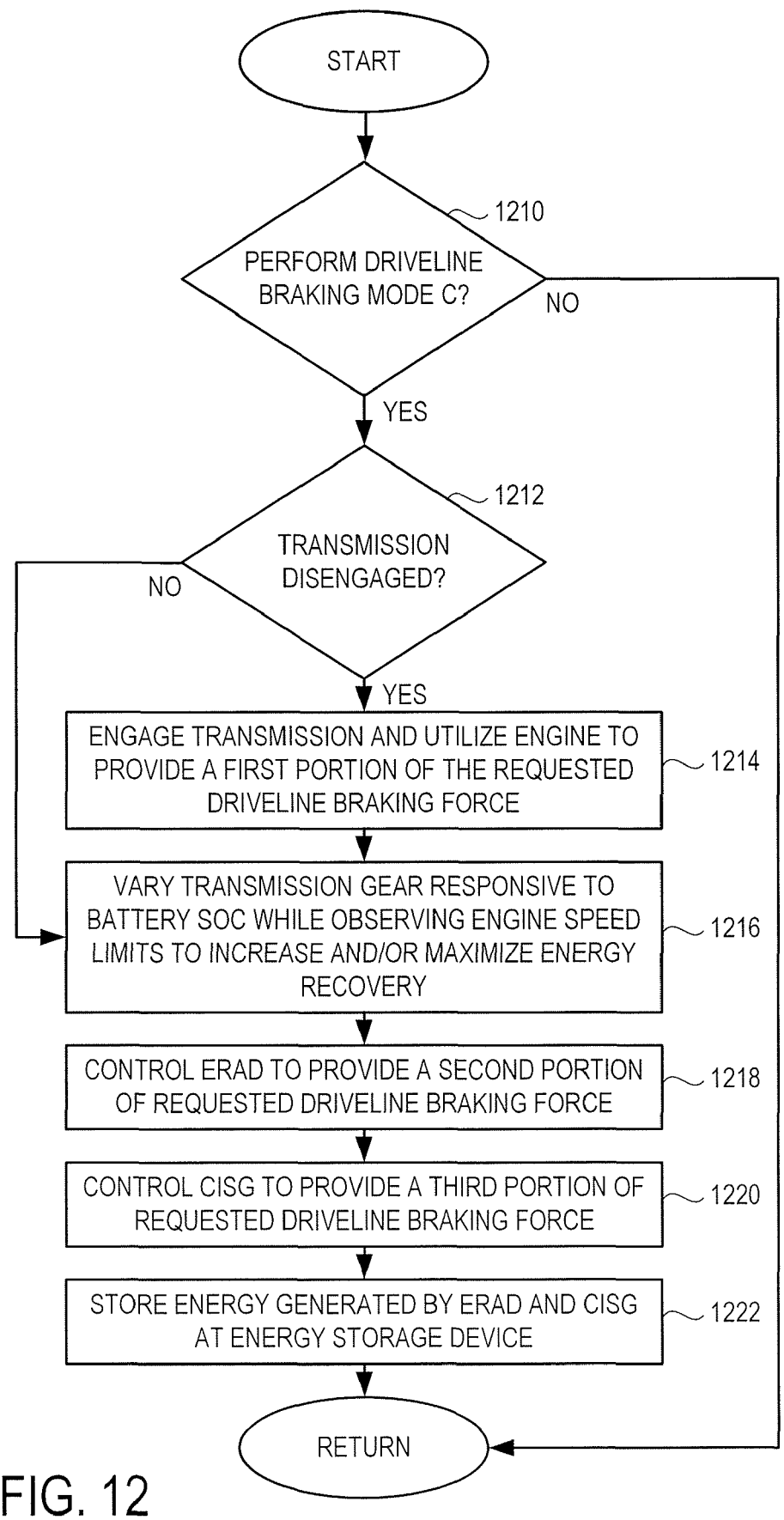
FIG. 12 is a flow chart depicting a control routine for the third braking mode.

FIG. 12 is a control routine that may be performed by the control system to achieve driveline braking via mode C. At 1210 it may be judged whether driveline braking is to be performed in mode C. If the answer at 1210 is no, the routine may return. Alternatively, if the answer at 1210 is yes, it may then be judged whether the transmission is disengaged at 1212.

If the answer at 1212 is yes (i.e. the transmission is disengaged), the control system can engage the transmission at 1214 by reducing the slip in the torque converter or by transitioning the transmission into one of the torque transmitting gears. Further, upon engagement of the transmission, the engine can provide at least a first portion of the requested driveline braking force. Alternatively, if the answer at 1212 is no or from 1214 where the transmission is engaged, the transmission gear may be varied responsive to the battery SOC while observing engine speed limits to increase and/or maximize energy recovery. For example, the control system may seek to delay downshifts of the transmission, which would increase engine braking until the battery SOC or power exchange limitations are approaching capacity. As another example, the control system may shift the transmission to a higher gear to reduce engine braking, thereby increasing energy recovery via the ERAD and/or CISG.

At 1218, the ERAD can be controlled to provide a second portion of the requested driveline braking force in addition to the engine. As one non-limiting example, the ERAD may be operated to provide a braking force that is at or near its braking threshold (at least during conditions where battery charging is requested), whereby the remaining driveline torque may be transmitted through the transmission where it may be absorbed by the engine and/or CISG. In other words, the transmission state may be controlled to transmit a level of torque that is not absorbed by the ERAD by selecting an appropriate transmission gear and/or by varying the torque converter state.

At 1220, the CISG can be controlled to provide a third portion of the requested driveline braking force in addition to the engine and ERAD. At 1222, the energy generated by the ERAD and CISG during the braking operation can be stored at the energy storage device. Finally, the routine may return.

Mode D

Figure 13:
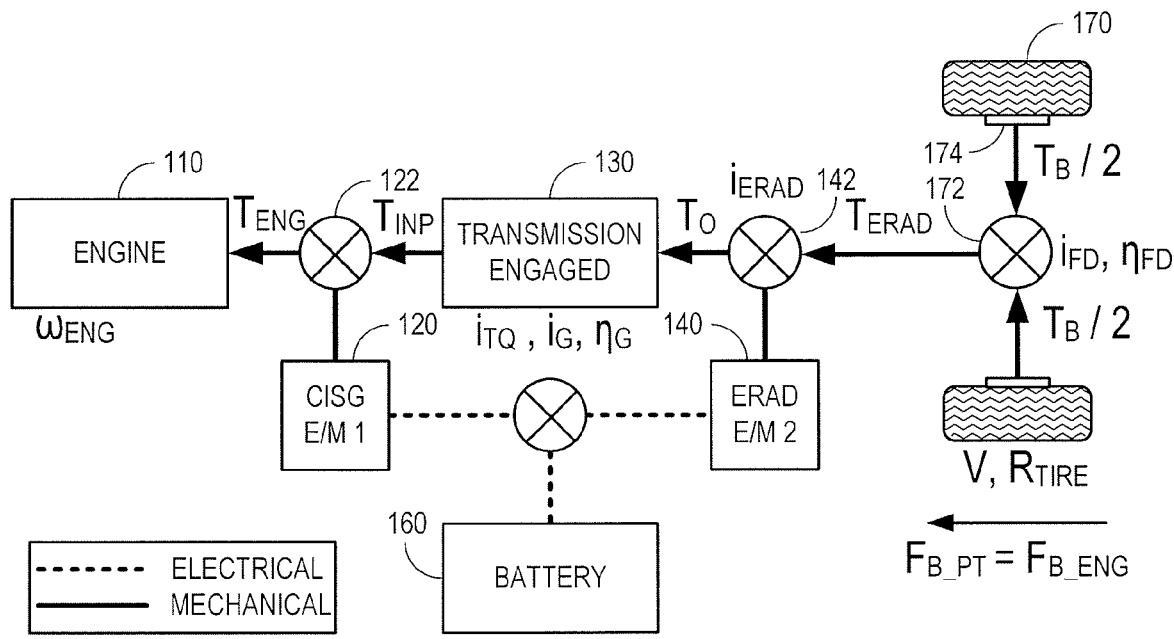
FIG. 13 is a schematic illustration of the energy flow paths for a fourth braking mode of an example hybrid propulsion system. (minor: need to remove energy flow arrow heads from summer blocks to CISG/ERAD since only engine braking used and electric machines are shutdown)

FIG. 13 is a schematic illustration of driveline braking control in mode D. As the SOC of the energy storage device reaches the maximum allowable limit or energy exchange limit (e.g. power limit) and if the requested driveline braking force is greater than the maximum or threshold braking force of the ERAD, state D can be selected for driveline braking control. In order to achieve the requested driveline braking force, engine braking can be controlled by selecting the appropriate gear for the given vehicle speed. The transmission gear can be selected such that driveline braking force is at least equal to or greater than the requested braking force as described by the following equation:

$$F_{B\_DES} = F_{B\_ENG} = \frac{(-T_{ENG}) \cdot i_G \cdot \eta_G \cdot i_{FD} \cdot \eta_{FD}}{R_{TIRE}}$$

select gear ratio, $i_G$, such that $F_{B\_ENG} \geq F_{B\_DES}$
where $T_{ENG}$: engine braking torque, $F_{B\_DES}$: desired driveline braking force,
$F_{B\_ENG}$: engine braking force If there is excessive engine braking in the lower gear beyond the requested braking force, the CISG and/or ERAD can be temporarily used to offset the undesirable engine braking by supplying torque to the driveline. During operation in mode D, the CISG and ERAD can be controlled to provide zero torque so that engine braking is used as the main driveline braking control. However, it should be appreciated that in some embodiments, the ERAD and CISG may apply a relatively small amount of driveline braking torque compared to the engine. As such, mode D can be used where no energy recovery is desired. As one non-limiting example, the control strategy can minimize or reduce operation in mode D to conditions where the energy storage device is unable to accept additional energy.

Figure 14:
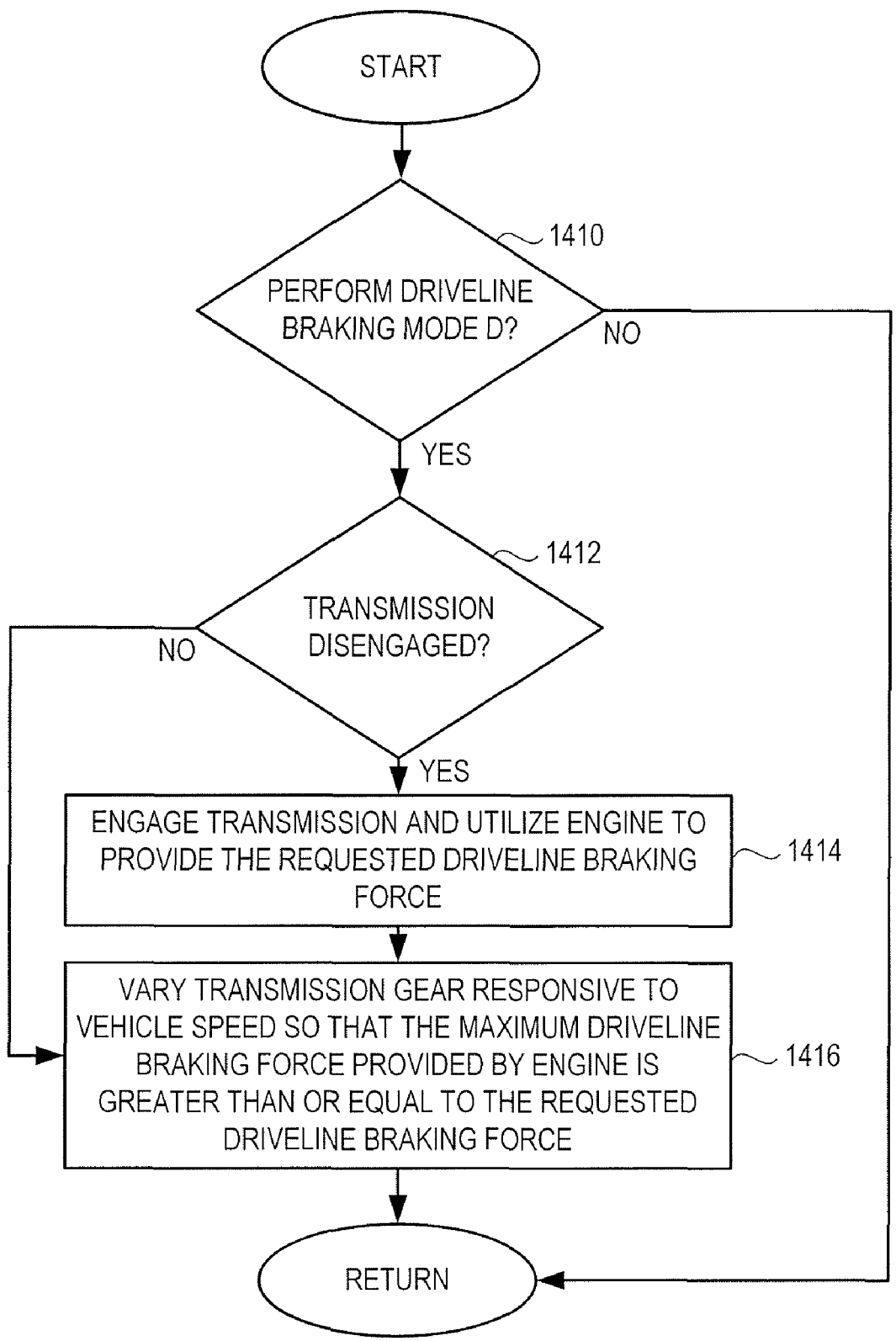
FIG. 14 is a flow chart depicting a control routine for the fourth braking mode.

FIG. 14 is a control routine that may be performed by the control system to achieve driveline braking via mode D. At 1410 it may be judged whether driveline braking is to be performed in mode D. If the answer at 1410 is no, the routine may return. Alternatively, if the answer at 1410 is yes, it may then be judged whether the transmission is disengaged at 1412.

If the answer at 1412 is yes (i.e. the transmission is disengaged), the control system can engage the transmission at 1414 by reducing the slip in the torque converter and/or by transitioning the transmission into one of the torque transmitting gears. Upon engagement of the transmission, the engine can provide at least the requested driveline braking force. Alternatively, if the answer at 1412 is no or from 1414 where the transmission is engaged, the transmission gear selection may be varied at 1416 responsive to the vehicle speed and requested driveline braking force while observing engine speed limits. As described above, where engine braking exceeds the requested driveline braking force, the ERAD and/or the CISG can be operated to supply torque to the driveline to offset the engine braking, thereby achieving the desired level of braking torque.

Figure 15:
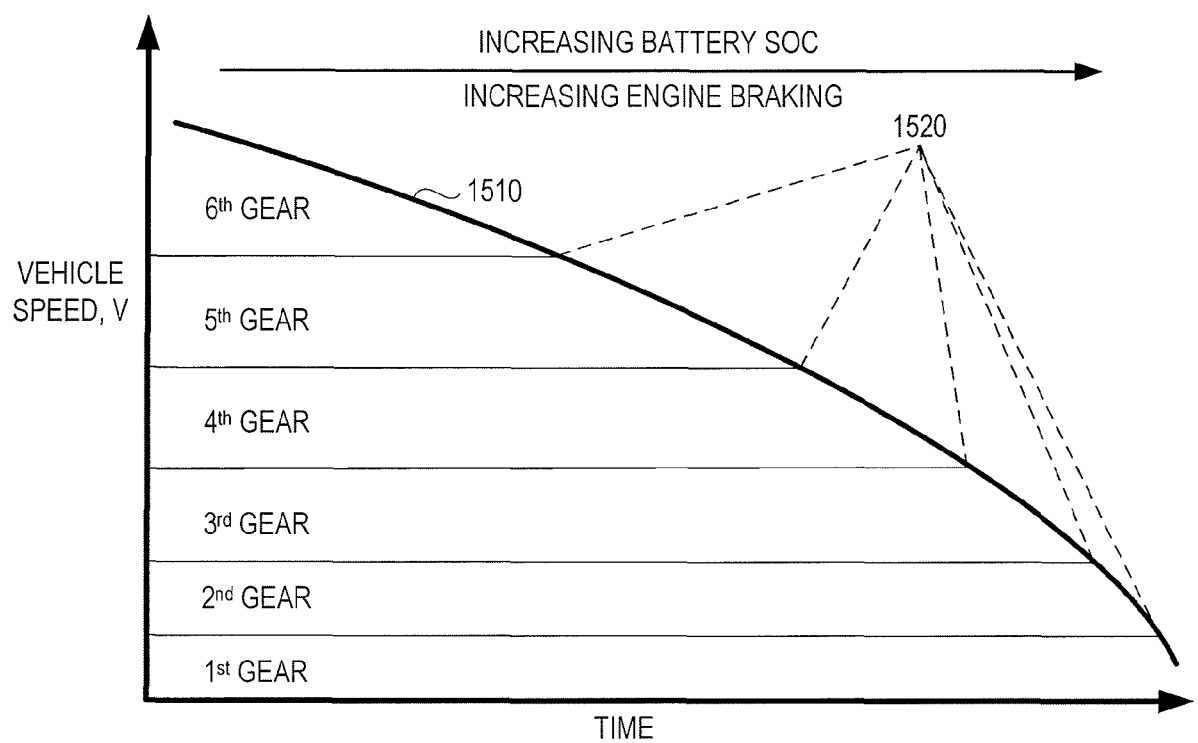
FIG. 15 is a graph representing an example transmission shift strategy.

FIG. 15 is a graph depicting an example shift strategy that can be performed by the control system at least during operation in mode C. The graph of FIG. 15 illustrates an example deceleration operation where time is represented on the horizontal axis and vehicle speed is represented on the vertical axis. As indicated by 1510, vehicle speed decreases with time due to driveline braking with or without the use of friction brakes. During the braking operation, the highest gear within the engine and/or transmission speed limitations may be selected while considering state of the energy storage device, and braking limitations of the ERAD and CISG. As the vehicle speed is reduced over time due to driveline braking, the transmission may be downshifted to avoid limitations of the energy storage device, engine speed constraints, and/or braking limitations of the ERAD and/or CISG. As described above with reference to mode C, transmission shifts can be delayed to reduce engine braking and enable increased energy recovery via the ERAD and/or CISG as indicated at 1520.

Figure 16:
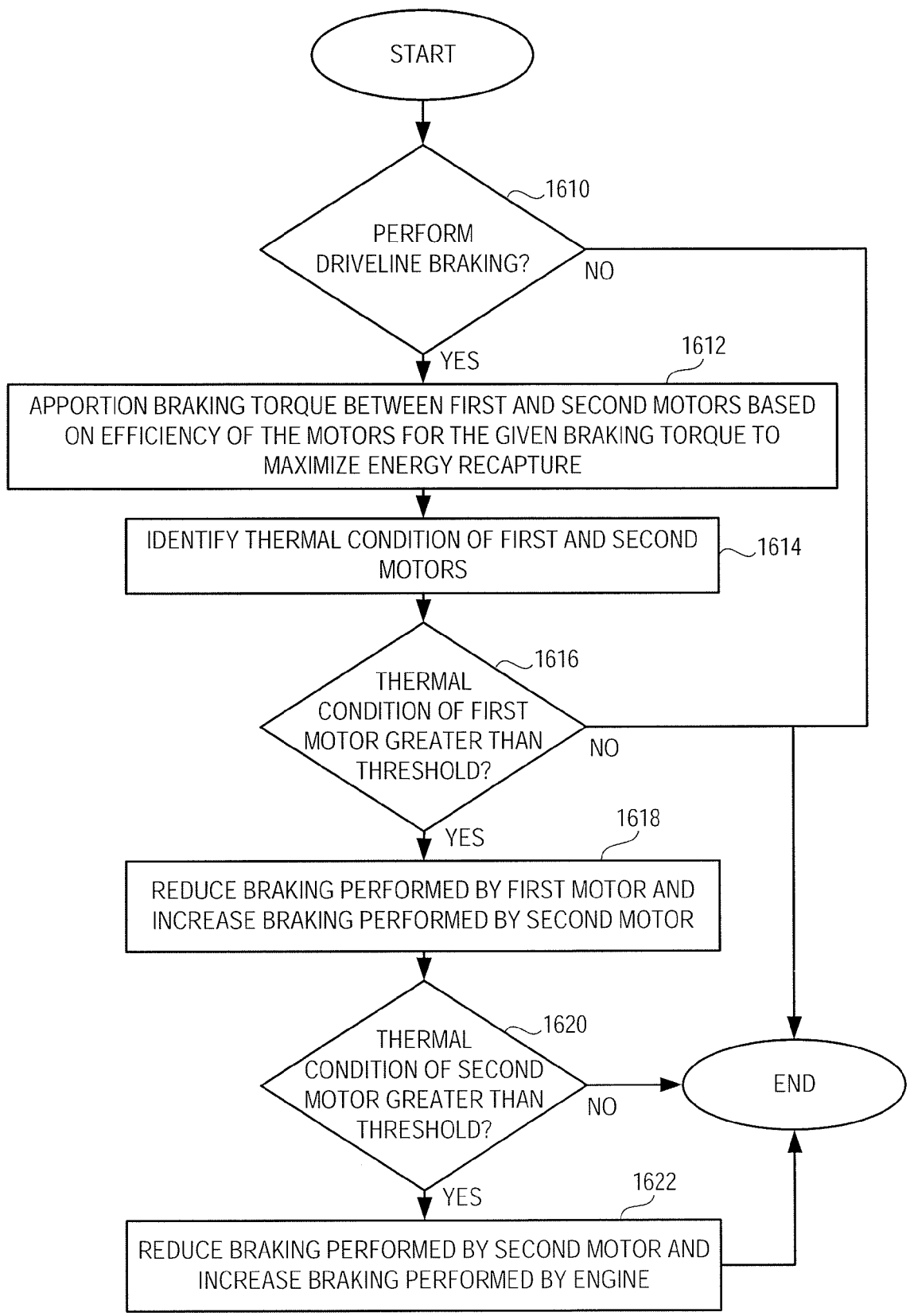
FIG. 16 is a flow chart depicting a control routine for controlling a level of braking torque provided by a first motor and a second motor responsive to thermal conditions and/or an efficient operating range of the motors.

FIG. 16 is a flow chart depicting an example control strategy for apportioning braking torque between at least two motors of the propulsion system to provide efficient energy recapture and thermal protection of the driveline components. Note that in this example, the first motor may include the CISG or the ERAD and the second motor may include the other of the CISG or ERAD.

At 1610, it may be judged whether to perform driveline braking. If the answer at 1610 is no, the routine may end. If the answer at 1610 is yes, the braking torque may be apportioned between at least the first and the second motors based the efficiency of each of the motors for the given braking torque in order to increase or maximize energy recapture. For example, the first motor may be operated to provide a threshold amount of braking torque to the driveline based on the efficiency of the first motor at converting the braking torque to energy storable by the energy storage device. As one example, efficiency may be judged based on an amount of electrical energy generated by the first motor for the level of vehicle braking provide by the first motor. As another example, the control system may utilize values or look-up tables stored in memory to identify efficient operating ranges for the motor based on operating conditions such as motor speed, motor torque, motor temperature, and electrical energy generated by the motor, among other operating conditions.

Where the braking torque provided by the first motor is less than a lower torque threshold, the braking provided by the second motor and/or engine may be reduced to enable an increase in the amount of braking torque provided by the first motor. Alternatively, where the braking torque provided by the first motor is greater than an upper torque threshold, the amount of braking torque provided by the second motor and/or engine may be increased to enable a reduction in the amount of braking torque provided by the first motor. As one non-limiting example, the driveline braking mode may be transitioned from one of Modes A-D to another of Modes A-D to facilitate the apportioning of braking torque among the motors in order to improve the efficiency of the energy recapture operation. In this way, the braking torque may be apportioned between at least a first and a second motor so that the motors are operated to efficiently recapture energy during a braking operation.

At 1614, the thermal conditions of the first and second motors may be identified. As one example, the motors may each include a temperature sensor that is operatively coupled to the control system. As another example, the temperature of the first and second motors may be inferred, for example, based on past and/or current operation of the motors. At 1616, it may be judged whether the thermal condition of the first motor is greater than a threshold. For example, the control system may judge whether the temperature of the first motor is greater than a temperature set point. If the answer is no, the routine may return or may perform the operation at 1616 for the second motor. Alternatively, if the answer at 1616 is yes, the routine may proceed to 1618.

At 1618, the braking performed by the first motor may be reduced and the level of braking performed by the second motor may be increased in proportion to the reduction in braking by the first motor. Alternatively, the braking performed by the engine and/or second motor may be increased in proportion to the reduction in braking by the first motor. In this way, the temperature of the first motor may be reduced by reducing the amount of braking torque converted to energy storable by the energy storage device.

At 1620, it may be judged whether a thermal condition of the second motor has reached or exceeded a threshold. For example, the approach taken for identifying the temperature of the second motor may include one of the approaches describe with reference to 1616 for the first motor. Note that the thermal threshold for the second motor may be the same or different from the first motor. If the answer at 1620 is no, the routine may end. Alternatively if the answer at 1620 is yes, the braking torque provided by the second motor may be reduced and the braking torque provided by the engine may be increased proportionately at 1622. Alternatively, or additionally, the amount of braking provided by the friction brakes may be increased to supplement the reduction in braking by the first and/or the second motors.

In this way, the total braking torque provided by the vehicle driveline may remain substantially the same, while adjusting the amount of braking torque provided by each of the motors and the engine in response to thermal conditions and the efficient operating range of the motors. Thus, the motors may be protected from thermal degradation while providing efficient energy recapture. As one non-limiting example, the driveline braking mode may be transitioned from one of Modes A-D to another of Modes A-D to redistribute braking torque among the motors based on thermal conditions.

In summary, the control strategies presented herein take advantage of the regenerative capability of the hybrid powertrain in coordination with transmission state selection to provide enhanced negative driveline torque control. Benefits of utilizing such a control strategy include reducing the frequency of transmission shifting during a braking operation by operating the ERAD and/or enabling the selection of a suitable braking mode from a plurality of braking modes. It should be appreciated that with each of the braking modes described herein, the control system can utilize the friction brakes where appropriate to supplement driveline braking in order to achieve the total desired vehicle braking force.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied with various combinations of different engine, transmission, motor configurations. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method of controlling a hybrid propulsion system for a vehicle including at least an internal combustion engine and an electric motor, wherein said engine is coupled to at least one drive wheel of the vehicle via a transmission, the method comprising:
receiving a vehicle braking request;
adjusting a state of the transmission to increase a level of braking force provided to the drive wheel of the vehicle by the engine in response to the vehicle braking request; and
varying a level of torque exchanged between the electric motor and the drive wheel responsive to the level of braking force provided by the engine.

2. The method of claim 1, wherein the electric motor is coupled to an opposite side of the transmission from the engine.

3. The method of claim 1, wherein the electric motor is coupled directly to a crankshaft of the engine.

4. The method of claim 1, wherein said varying the level of torque exchanged between the electric motor and the drive wheel includes absorbing torque from the drive wheel at the motor to further increase the level of braking force.

5. The method of claim 1, wherein said motor converts torque absorbed from the drive wheel to electrical energy, and wherein the method further comprises storing at least a first portion of said electrical energy at an energy storage device of the vehicle; and supplying a second portion of said electrical energy to a second motor of the vehicle and operating said second motor to supply torque to said engine.

6. A method for a hybrid propulsion system for a vehicle, the vehicle comprising at least one drive wheel, a first motor coupled to the drive wheel, a second motor, a transmission including a first end coupled to the drive wheel and a second end coupled to the second motor, and a control system, the method comprising:
controlling operation of the first motor to provide vehicle braking torque;
controlling operation of the second motor to provide vehicle braking torque; and
adjusting a transmission state in response to an amount of braking torque provided by the first motor and an amount of braking torque provided by the second motor.

7. The method of claim 6, wherein the transmission state is an engaged state of the transmission.

8. The method of claim 6, wherein the transmission state is a gear of the transmission.

9. The method of claim 6, wherein the transmission state is a torque ratio of the transmission and wherein the torque ratio is increased responsive to an increase in the amount of braking torque provided by the second motor.

10. The method of claim 6, wherein the control system is further configured to perform a first mode, wherein braking torque is provided by the first motor, the second motor does not provide braking torque, and wherein the transmission is disengaged.

11. The method of claim 10, further comprising an internal combustion engine coupled to the second motor, wherein the control system is configured to perform a second mode wherein the first motor provides vehicle braking torque, the second motor provides torque to rotate the internal combustion engine of the vehicle, and wherein the transmission is disengaged.

12. The method of claim 11, wherein the control system is further configured to perform a third mode, wherein at least the engine and the first motor provide braking torque and the transmission is engaged.

13. The method of claim 12, wherein the control system is further configured to perform a fourth mode, wherein at least the engine provides braking torque and the first motor does not provide braking torque.

14. A method for a hybrid propulsion system for a vehicle, comprising at least one drive wheel; a first motor coupled to the drive wheel, said first motor configured to generate electrical energy from kinetic energy received at the drive wheel; a second motor configured to generate electrical energy from kinetic energy received at the drive wheel; a transmission including a first end coupled to the first motor and a second end coupled to the second motor; and a control system, the method comprising:

varying a relative level of electrical energy generated by the first motor in response to an operating condition to provide vehicle braking; and varying a relative level of electrical energy generated by the second motor in response to the operating condition to provide vehicle braking.

15. The method of claim 14, wherein the operating condition includes a torque ratio of the transmission.

16. The method of claim 14, wherein the control system is configured to vary a selected gear of the transmission responsive to a relative level of electrical energy generated by the first motor and the second motor.

17. The method of claim 14, wherein the operating condition includes a rate of deceleration of the drive wheel.

18. The method of claim 17, wherein the level of electrical energy generated by the second motor is increased relative to the level of electrical energy generated by the first motor with an increasing rate of deceleration of the drive wheel.

19. The method of claim 14, wherein the hybrid propulsion system for the vehicle further comprises an internal combustion engine coupled to the second motor, and wherein the control system is further configured to adjust a speed ratio between the first end and the second end of the transmission in response to a rotational speed of the engine.

20. The method of claim 14, wherein the operating condition includes an efficient operating range of at least one of the first motor and the second motor.

* * * * *